United States Patent [19]
Hullender

[11] Patent Number: 6,094,506
[45] Date of Patent: *Jul. 25, 2000

[54] AUTOMATIC GENERATION OF PROBABILITY TABLES FOR HANDWRITING RECOGNITION SYSTEMS

[75] Inventor: Gregory N. Hullender, Kirkland, Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/548,261

[22] Filed: Oct. 25, 1995

[51] Int. Cl.⁷ .............................. G06K 9/18; G06K 9/46
[52] U.S. Cl. ......................... 382/186; 382/192; 382/203; 382/228; 382/185
[58] Field of Search ................... 382/185, 186, 382/187, 228, 209, 217, 218, 190, 192, 194, 188, 189

[56] References Cited

U.S. PATENT DOCUMENTS

| | | | |
|---|---|---|---|
| 3,748,644 | 7/1973 | Tisdale | 382/218 |
| 3,979,722 | 9/1976 | Sakoe | 382/215 |
| 4,365,235 | 12/1982 | Greanias et al. | 382/189 |
| 4,542,526 | 9/1985 | Satoh et al. | 382/187 |
| 4,556,985 | 12/1985 | Hougo | 382/218 |
| 4,573,126 | 2/1986 | Crane et al. | 382/185 |
| 4,628,532 | 12/1986 | Stone et al. | 382/197 |
| 4,653,107 | 3/1987 | Shojima et al. | 382/189 |
| 4,672,677 | 6/1987 | Yamakawa | 382/185 |
| 4,680,804 | 7/1987 | Kuzunuki et al. | 382/185 |
| 4,680,805 | 7/1987 | Scott | 382/197 |
| 4,685,142 | 8/1987 | Ooi et al. | 382/185 |
| 4,701,960 | 10/1987 | Scott | 382/122 |
| 4,718,103 | 1/1988 | Shojima et al. | 382/189 |
| 4,979,226 | 12/1990 | Sato | 382/218 |
| 5,068,664 | 11/1991 | Appriou et al. | 342/90 |

(List continued on next page.)

FOREIGN PATENT DOCUMENTS 0 632 403 A2  1/1995  European Pat. Off. ......... G06K 9/48

OTHER PUBLICATIONS

Computer Dictionary, Third Edition, Microsoft Press, p. 133, 1997.

Charles C. Tappert et al., "The State of the Art in On–Line Handwriting Recognition," *IEEE Transactions On Pattern Analysis and Machine Intelligence*, vol: 12, No. 8, pp. 787–808, Aug. 1990.

(List continued on next page.)

*Primary Examiner*—Jon Chang
*Attorney, Agent, or Firm*—Seed and Berry LLP

[57] ABSTRACT

A computer system and method for generating probability tables for use in recognizing handwritten characters. The system receives handwritten characters as a sequence of strokes. The system characterizes each stroke by its shape and position. The position is represented as a pair of coordinates specifying the starting and ending points of the stroke. The system represents an input handwritten character by a string representing the shapes of the strokes and by a string of the pairs of coordinates of the strokes. The strings are ordered by the sequence in which the strokes are written. The system compares all possible pairs of a large sample of handwritten characters one to another by comparing the shape and position of each stroke in one character with those of the corresponding stroke of the other character. When comparing the two strokes, the system generates a pair of shapes and the sum of the squared distances between the starting points and the ending points of the two strokes. Based on these comparisons, the system generates the probabilities that any two handwritten characters that have the same number of strokes and that have a certain pair of shapes in the same relative place in their strings will represent the same character and that any two handwritten characters that have the same number of strokes and that have a pair of positions in the same relative place in their corresponding strings such that the sum of distances between the pair of positions is a certain distance, will represent the same character.

44 Claims, 30 Drawing Sheets

U.S. PATENT DOCUMENTS

| | | | |
|---|---|---|---|
| 5,105,470 | 4/1992 | Will | 382/228 |
| 5,113,452 | 5/1992 | Chatani et al. | 382/187 |
| 5,151,950 | 9/1992 | Hullender | 382/187 |
| 5,265,174 | 11/1993 | Nakatsuka | 382/189 |
| 5,309,522 | 5/1994 | Dye | 382/209 |
| 5,313,527 | 5/1994 | Gubernan et al. | 382/187 |
| 5,325,388 | 6/1994 | Gupta et al. | 372/50 |
| 5,392,367 | 2/1995 | Hsu et al. | 382/228 |
| 5,671,292 | 9/1997 | Lee et al. | 382/218 |
| 5,708,731 | 1/1998 | Shimotori et al. | 382/194 |
| 5,729,629 | 3/1998 | Dai | 382/187 |

OTHER PUBLICATIONS

Keinosuke Fukunaga, "*Introduction to Statistical Pattern Recognition,*" Second Edition, Academic Press, Inc., Harcourt Brace Jovanovich, Publishers, Chapter 11, pp. 508–563, 1990.

Richard O. Duda and Peter E. Hart, "*Pattern Classification and Scene Analysis,*" A Wiley–Interscience Publication, John Wiley & Sons, Chapters 6–7, pp. 189–297, 1973.

Katsuo Ikeda et al., "On–Line Recognition of Hand–Written Characters Utilizing Positional and Stroke Vector Sequences," *Fourth International Joint Conference On Pattern Recognition*, pp. 813–815, Nov. 7–10, 1978.

Rafael C. Gonzalez and Richard E. Woods, "*Digital Image Processing,*" Addison–Wesley Publishing Company, Inc., pp. 580–581, 1992.

0 1 2

Set of Shape Features 1 2 3 4 5 6 7

Alphabet

Shape Feature Probability Matrix

| | 0 | 1 | 2 |
|---|---|---|---|
| 2 | 26 | 32 | 10 |
| 1 | 27 | 17 | 32 |
| 0 | 17 | 27 | 26 |

— 401

— 402

| 3 | 7 | 13 | 22 | 30 | 17 | 26 | 32 | 11 | 41 | 46 | 255 | 255 | 24 | 255 | 32 | 255 | 255 | 26 | 255 |
|---|---|---|---|---|---|---|---|---|---|---|---|---|---|---|---|---|---|---|---|
| 0 | 1 | 2 | | | 5 | | | | | 10 | | | | | 15 | | | | |

| 255 | 27 | 255 | 255 | 255 | 48 | 53 | 255 | 255 | 16 | 27 | 22 | 12 | 34 | 27 | 21 | 26 | 42 | 255 | 39 |
|---|---|---|---|---|---|---|---|---|---|---|---|---|---|---|---|---|---|---|---|
| 20 | | | | | 25 | | | | | 30 | | | | | 35 | | | | |

| 255 | 25 | 42 | 27 | 7 | 26 | 19 | 255 | 255 | 255 | 35 | 25 | 255 | 255 | 42 | 14 | 255 | 255 | 255 | 255 |
|---|---|---|---|---|---|---|---|---|---|---|---|---|---|---|---|---|---|---|---|
| 40 | | | | | 45 | | | | | 50 | | | | | 55 | | | | 59 |

99

Position Feature Probability Table

Unknown

Feature String 1,0

Start/End [1,4 : 5,5]

Start/End [5,5 : 4,0]

To compare unknown with

Compute:
  Probability 1 = SFPM [1][1] + SFPM [0][2] = 17 + 26 = 43

(distance)² between starting and ending points of corresponding features =

$(1-0)^2 + (4-5)^2 = 2$ ⎫
  $(5-5)^2 + (5-5)^2 = 0$ ⎬ 2
  $(5-5)^2 + (5-5)^2 = 0$ ⎫
  $(4-5)^2 + (0-1)^2 = 2$ ⎬ 2

Probability 2 = PFPT [2] + PFPT [2] = 26

Match probability = probability 1 + probability 2 = 69

Character Number

| | 1 | 2 | 3 | 4 | 5 | 6 | 7 |
|---|---|---|---|---|---|---|---|
| | NA | NA | 43 | 53 | 54 | 34 | 34 |
| | | | 59 | 49 | 34 | 43 | 59 |
| | | | | | 59 | 54 | 54 |

601 → Probability 1

| | 1 | 2 | 3 | 4 | 5 | 6 | 7 |
|---|---|---|---|---|---|---|---|
| | NA | NA | 26 | 268 | 52 | 20 | 66 |
| | | | 52 | 60 | 63 | 14 | 46 |
| | | | | | 294 | 73 | 52 |

602 → Probability 2

| | 1 | 2 | 3 | 4 | 5 | 6 | 7 |
|---|---|---|---|---|---|---|---|
| | NA | NA | 69 | 321 | 106 | 54 | 100 |
| | | | 111 | 109 | 97 | 57 | 105 |
| | | | | | 353 | 127 | 106 |

603 →

Match Probabilities

| | Character No. 1 | 2 | 3 | 4 | 5 | 6 | 7 |
|---|---|---|---|---|---|---|---|
| 1 | 0<br>[3,5 : 3,0] | 2<br>[5,4 : 5,1] | 1,2<br>[0,5 : 5,5]<br>[5,5 : 5,1] | 0,2<br>[4,5 : 4,1]<br>[4,5 : 4,1] | 0,1<br>[3,5 : 3,0]<br>[0,5 : 5,5] | 1,0<br>[0,5 : 5,5]<br>[5,5 : 5,0] | 1,0<br>[0,5 : 5,5]<br>[1,4 : 1,0] |
| 2 | 0<br>[4,5 : 2,0] | 2<br>[4,5 : 3,1] | 2,1<br>[5,4 : 3,0]<br>[2,5 : 5,4] | 2,0<br>[5,5 : 3,1]<br>[5,5 : 3,0] | 1,0<br>[0,5 : 5,4]<br>[3,4 : 2,0] | 0,1<br>[5,4 : 3,0]<br>[1,5 : 5,4] | 1,0<br>[2,4 : 5,5]<br>[2,5 : 1,0] |
| 3 | 0<br>[2,5 : 3,0] | 2<br>[4,5 : 5,2] | 1,2<br>[0,4 : 3,4]<br>[3,4 : 5,2] | 2,0<br>[3,4 : 4,1]<br>[3,5 : 4,1] | 0,1<br>[3,3 : 4,0]<br>[0,3 : 5,5] | 1,0<br>[0,4 : 3,4]<br>[3,4 : 5,0] | 0,1<br>[0,3 : 3,0]<br>[0,3 : 3,5] |
| 4 | 2<br>[3,5 : 3,0] | 2<br>[4,5 : 4,1] | 2,1<br>[5,4 : 5,0]<br>[0,4 : 5,4] | 2,0<br>[4,4 : 4,1]<br>[4,5 : 4,0] | 2,1<br>[4,5 : 3,0]<br>[0,4 : 5,5] | 1,0<br>[0,5 : 5,4]<br>[5,5 : 5,0] | 2,1<br>[1,5 : 2,0]<br>[0,5 : 5,5] |
| 5 | 0<br>[3,5 : 3,0] | 2<br>[4,5 : 4,1] | 1,2<br>[2,5 : 5,5]<br>[5,5 : 5,1] | 0,2<br>[4,5 : 4,1]<br>[4,5 : 4,1] | 0,1<br>[3,3 : 3,0]<br>[0,4 : 4,4] | 1,2<br>[0,4 : 5,5]<br>[5,5 : 5,0] | 0,1<br>[0,5 : 1,0]<br>[0,5 : 5,5] |
| 6 | 0<br>[3,5 : 3,0] | 2<br>[4,4 : 4,1] | 1,2<br>[3,5 : 5,5]<br>[5,5 : 5,1] | 0,2<br>[4,4 : 3,1]<br>[4,4 : 3,1] | 0,1<br>[3,4 : 3,0]<br>[0,3 : 5,5] | 0,1<br>[4,5 : 3,0]<br>[1,4 : 4,4] | 0,1<br>[2,5 : 3,0]<br>[1,5 : 4,5] |
| 7 | 0<br>[3,5 : 3,0] | 2<br>[4,4 : 4,1] | 1,2<br>[1,5 : 5,5]<br>[5,5 : 5,0] | 0,2<br>[5,5 : 4,1]<br>[5,4 : 4,1] | 0,1<br>[3,4 : 3,0]<br>[0,4 : 5,4] | 0,1<br>[5,5 : 5,0]<br>[3,5 : 5,5] | 0,1<br>[0,5 : 0,0]<br>[0,5 : 3,5] |

7 Handwriting Samples

Type Position Length    Match Counts

| 6 | 0 | 1 |
|---|---|---|
| 0 | 0 | 0 |
| 36 | 0 | 6 |

| 6 | 0 | 50 |
|---|---|---|
| 0 | 0 | 0 |
| 36 | 0 | 6 |

| 6 | 20 | 79 |
|---|---|---|
| 0 | 29 | 20 |
| 36 | 0 | 6 |

| 30 | 20 | 104 |
|---|---|---|
| 0 | 29 | 20 |
| 51 | 0 | 30 |

| 35 | 21 | 105 |
|---|---|---|
| 11 | 66 | 21 |
| 77 | 11 | 35 |

| 38 | 24 | 106 |
|---|---|---|
| 32 | 91 | 24 |
| 95 | 32 | 38 |

| 42 | 26 | 107 |
|---|---|---|
| 50 | 120 | 26 |
| 115 | 50 | 42 |

| 250 | 244 | 213 |
|-----|-----|-----|
| 336 | 400 | 244 |
| 373 | 336 | 250 |

Total Counts

| 42  | 26  | 107 |
|-----|-----|-----|
| 50  | 120 | 26  |
| 115 | 50  | 42  |

Match Counts

| 26 | 32 | 10 |
|----|----|----|
| 27 | 17 | 32 |
| 17 | 27 | 26 |

BFP

Samples: 2001

| 1 | 2 |
|---|---|
| 14 | 35 |

2003:

| | |
|---|---|
| 1 | 0 |
| 2 | 1 |
| 1 | 2 |
| 2 | 3 |
| 1 | 4 |
| 2 | 5 |
| 1 | 6 |
| 2 | 7 |
| 1 | 8 |
| 2 | 9 |
| 1 | 10 |
| 2 | 11 |
| 1 | 12 |
| 2 | 13 |

2002, 2004:

| | |
|---|---|
| 3 | 0 |
| 4 | 1 |
| 5 | 2 |
| 6 | 3 |
| 7 | 4 |
| 3 | 5 |
| 4 | 6 |
| 5 | 7 |
| 6 | 8 |
| 7 | 9 |
| 3 | 10 |
| 4 | 11 |
| 5 | 12 |
| 6 | 13 |
| 7 | 14 |
| 3 | 15 |
| 4 | 16 |
| 5 | 17 |
| 6 | 18 |
| 7 | 19 |
| 3 | 20 |
| 4 | 21 |
| 5 | 22 |
| 6 | 23 |
| 7 | 24 |
| 3 | 25 |
| 4 | 26 |
| 5 | 27 |
| 6 | 28 |
| 7 | 29 |
| 3 | 30 |
| 4 | 31 |
| 5 | 32 |
| 6 | 33 |
| 7 | 34 |

Total Counts

Match Counts

| 0 | | | | | | | | | | 10 | | | | | | | | | |
|---|---|---|---|---|---|---|---|---|---|---|---|---|---|---|---|---|---|---|---|
| 130 | 84 | 88 | 34 | 18 | 34 | 24 | 4 | 10 | 4 | 2 | 0 | 0 | 6 | 0 | 2 | 0 | 0 | 6 | 0 |

| 20 | | | | | | | | | | 30 | | | | | | | | | |
|---|---|---|---|---|---|---|---|---|---|---|---|---|---|---|---|---|---|---|---|
| 0 | 4 | 0 | 0 | 0 | 2 | 2 | 0 | 0 | 10 | 10 | 4 | 6 | 10 | 12 | 14 | 6 | 2 | 0 | 2 |

| 40 | | | | | | | | | | 50 | | | | | | | | | |
|---|---|---|---|---|---|---|---|---|---|---|---|---|---|---|---|---|---|---|---|
| 0 | 8 | 4 | 6 | 6 | 8 | 10 | 0 | 0 | 0 | 4 | 4 | 0 | 0 | 2 | 6 | 0 | 0 | 0 | 0 |

Probability Table

| 0 | | | | | | | | | | 10 | | | | | | | | | |
|---|---|---|---|---|---|---|---|---|---|---|---|---|---|---|---|---|---|---|---|
| 3 | 7 | 13 | 22 | 30 | 17 | 26 | 32 | 11 | 41 | 46 | 255 | 255 | 24 | 255 | 32 | 255 | 255 | 26 | 255 |

| 20 | | | | | | | | | | 30 | | | | | | | | | |
|---|---|---|---|---|---|---|---|---|---|---|---|---|---|---|---|---|---|---|---|
| 255 | 27 | 255 | 255 | 255 | 48 | 53 | 255 | 255 | 16 | 27 | 22 | 12 | 34 | 27 | 21 | 26 | 42 | 255 | 39 |

| 40 | | | | | | | | | | 50 | | | | | | | | | |
|---|---|---|---|---|---|---|---|---|---|---|---|---|---|---|---|---|---|---|---|
| 255 | 25 | 42 | 27 | 7 | 26 | 19 | 255 | 255 | 255 | 35 | 25 | 255 | 255 | 42 | 14 | 255 | 255 | 255 | 255 |

*FIG. 24*

AUTOMATIC GENERATION OF PROBABILITY TABLES FOR HANDWRITING RECOGNITION SYSTEMS

TECHNICAL FIELD

The present invention relates to handwritten symbol recognition and more particularly to recognition of symbols using individual features of the symbols and the symbols as a whole.

BACKGROUND OF THE INVENTION

Computer systems have been used to recognize which characters of an alphabet correspond to handwritten data. Typically, recognition systems input handwriting using an electronic tablet and pen and then compare the handwriting to a database of character prototypes. For each character in the alphabet, the character prototypes for that character describe various ways in which that character may be handwritten. After comparing the handwriting to the character prototypes, the recognition system recognizes the handwriting as that character with the character prototype that most closely matches the handwriting. Generally, the accuracy of such recognition systems decreases and the time needed for recognition increases with the complexity of the alphabet to be recognized. The Chinese and Kanji alphabets, which have some 50,000 characters, are examples of such complex alphabets.

One handwriting recognition system that has been developed to recognize Kanji characters decomposes the handwritten characters into component strokes and categorizes each stroke by its characteristic features. The features by which a stroke is categorized are based on the shape and direction of the stroke (shape feature) and the starting and ending points of the stroke (position feature). A shape feature could be, for example, a horizontal stroke drawn from left to right or a slanted stroke drawn from the bottom to the top. Each shape feature is assigned a unique integer value. The recognition system identifies the shape feature and position feature of each stroke in a handwritten character and creates a shape feature string and a position feature string for that character. The feature strings are ordered based on the order in which the corresponding stroke was written. The feature in the first place of a feature string, for example, corresponds to the first written stroke of the character represented by the feature string. The shape and position feature strings contain a description of the handwritten character that is used to find a matching character prototype. For each character, the character prototypes contain the shape and position feature strings describing the various ways in which that character may be written.

If each character were always handwritten in the same unique way, then the recognition system would need only one character prototype for each character and recognition would be simplified. However, different people may write the same character by writing the strokes in different orders and in different relative positions, by substituting a stroke with one shape feature for a stroke of another shape feature, and by using different number of strokes. Thus, a particular character may have many character prototypes. Even with the use of many character prototypes, some handwritten characters may still not exactly match one of the character prototypes.

In order to recognize such unknown handwritten characters, the recognition system computes a matching score for every character prototype in the prototype database. The recognition system computes the matching score by comparing how closely the shape and position feature strings of the unknown character match the shape and position feature strings of a character prototype. The recognition system typically compares the feature string of the unknown character only to the feature strings of character prototypes with strings of the same length (i.e., same number of strokes) and only compares features at the same relative place within the feature strings.

The recognition system uses a shape feature matrix that is a square matrix whose row and columns are indexed by the shape features. Each entry of the matrix contains a rough estimate of the likelihood that the indexed pair of shape features can be substituted for one another. To determine how closely the shape feature strings of an unknown character and a character prototype match, the recognition system retrieves the first shape feature from each shape feature string and retrieves the matrix entry that is indexed by this pair of shape features. The recognition system then retrieves the second shape feature from each feature string and retrieves the matrix entry that is indexed by this pair of shape features. The recognition system then repeats this process for each pair of shape features in the shape feature strings. The recognition systems then totals all the retrieved entries. The higher the total, the more likely the unknown character matches the character prototype.

The recognition system uses the position features to make a threshold determination as to whether the unknown character and the character prototype match. For each pair of position features, the recognition system calculates the Euclidean distance between starting points of the strokes and the Euclidean distance between the ending points of the strokes. The recognition system then totals all the Euclidean distances. If the total distance exceeds a predefined threshold, then the character prototype is rejected as a possible matching character. Such a recognition system is described in U.S. patent application Ser. No. 08/452,660, which is hereby incorporated by reference.

The accuracy of the above described recognition system depends, in part, on the particular set of shape features that are defined, on the estimates in the shape feature matrix, and on the setting of the distance threshold. Thus, various combinations of different sets of shape features, different entries in the shape feature matrix, and different distance thresholds may improve accuracy. However, defining sets of shape features, estimating entries for the shape feature matrix, and setting the distance threshold can be very time-consuming. First, a person trying to improve the accuracy of the recognition system would define a new set of features. Then, the person would estimate entries for the shape feature matrix and set the distance threshold based on the newly defined set of shape features. Since there may be 20 shape features in a set, it may take a considerable amount of time for the person to generate the matrix of estimates. The person would then test the accuracy of the recognition system by regenerating the database of character prototypes and then attempting to recognize a large sample of handwritten characters. If the accuracy is not acceptable, then the estimates and distance threshold would need to be refined and the accuracy re-tested by again attempting to recognize a large sample of handwritten characters. This re-estimating and re-testing is very time consuming. Moreover, it is even more time consuming when the set of shape features is redefined. It is also not clear how to weigh the results of the shape feature comparison and the feature distances or whether either or both of the results can be linearly scaled to give matching values that might roughly correspond to statistical probabilities. In short, the accuracy of the recognition system depends on a fortuitous choice of a set of shape features, tedious trial and error refinements of the estimates in the shape feature matrix and the distance threshold, and a somewhat arbitrary choice of how to weigh the results of the shape feature comparison with the distance threshold.

SUMMARY OF THE INVENTION

A preferred embodiment of the present invention is directed to a pattern recognizer in a computer system that identifies one or more patterns that match an unknown pattern. The computer system has pattern prototypes and a probability table. Each pattern prototype is associated with an identification and with a set of characteristics that describe the pattern prototype (e.g., the shapes of the strokes in the pattern). Initially, the pattern recognizer determines the set of characteristics for the unknown pattern. The pattern recognizer then generates one or more comparison values for the pattern prototype by comparing the set of characteristics for the unknown pattern to the set of characteristics for the pattern prototype. The pattern recognizer uses the generated comparison values to retrieve probability values from the probability table. The pattern generator then combines the retrieved probability values for each pattern prototype to produce the combined probability value indicating the likelihood that the unknown pattern matches the pattern prototype. The pattern recognizer identifies the pattern prototype with the highest combined probability value as matching the unknown sample pattern.

The pattern recognizer generates the probability values of the probability table by comparing all possible pairs of a large group of sample patterns. The pattern recognizer then determines a match count of the number of times that each possible pair of characteristics occurs in the pairs of sample patterns at the same relative place within the pair of sets of characteristics and in which the sample pattern have the same identification. The pattern recognizer also determines a total count of the number of times that each possible pair of characteristics occurs in the pairs of sample patterns at the same relative place within the pair of sets of characteristics. The pattern recognizer then generates a probability value for each comparison value based on the match and total counts.

BRIEF DESCRIPTION OF THE DRAWINGS

FIG. 6 illustrates the shape and position intermediate probability values for a sample unknown character and the two-stroke prototypes.

FIG. 8 is a diagram of a sample data character database from which the system generates the SFP matrix.

FIG. 12 shows the final values for the TotalCounts, MatchCounts, and the SFP matrices.

FIG. 20 is a diagram of the Samples array.

FIGS. 23 and 24 contain the resulting TotalCounts and MatchCounts arrays along with the PFP table.

DETAILED DESCRIPTION OF THE INVENTION

Figure 1:
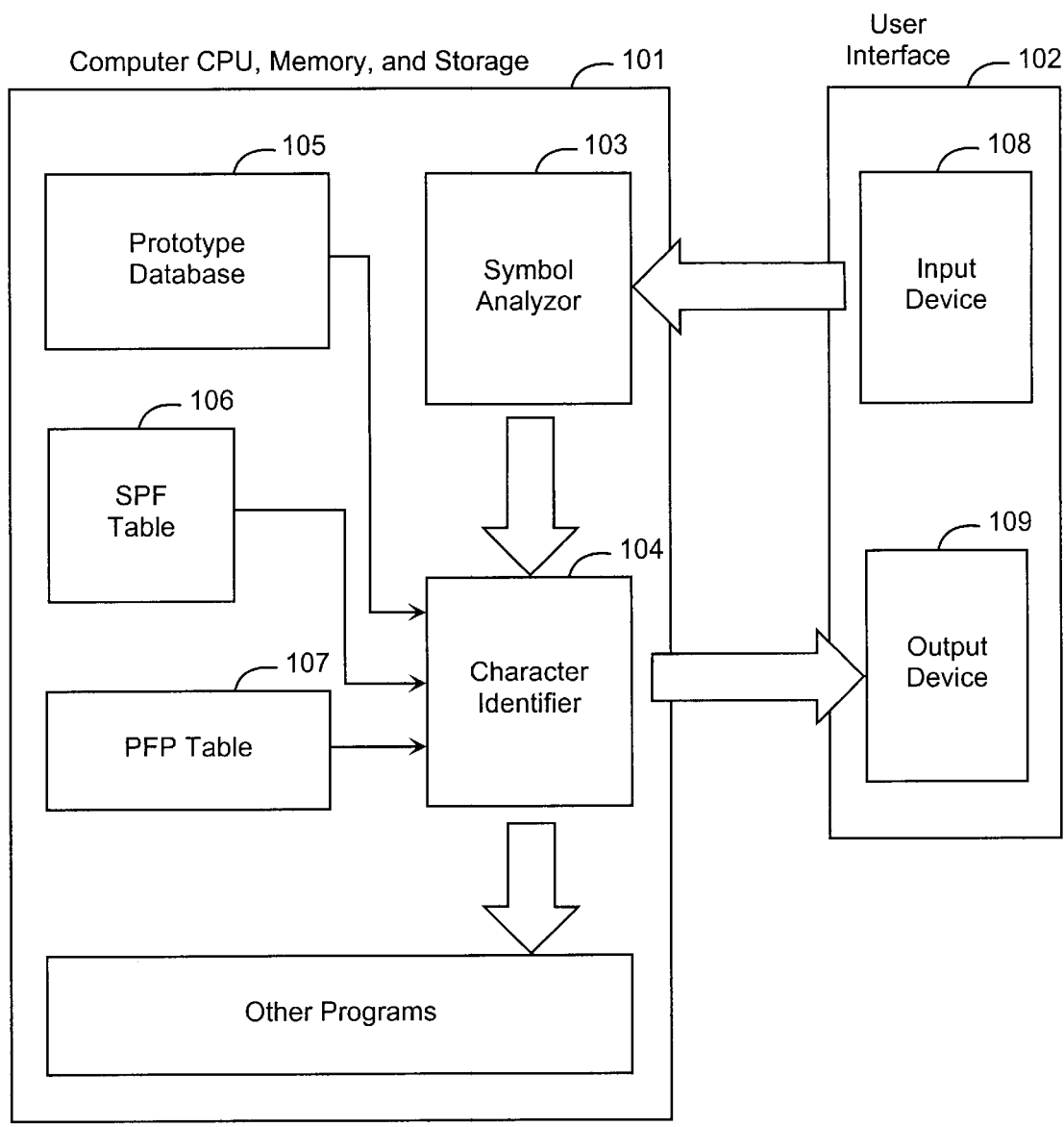
FIG. 1 is a block diagram illustrating a preferred embodiment of the handwritten symbol recognition system of the present invention.

A preferred embodiment provides a method and system for recognizing handwritten characters. The system recognizes the handwritten characters based on the probabilities associated with pairs of shape features and probabilities associated with pairs of position features. In one aspect of the present invention, the system automatically generates a shape feature probability (SFP) matrix. The SFP matrix is a square matrix in which the rows and columns are indexed by the shape features. Each entry contains the probability that any two handwritten character prototypes that have the same number of strokes and that have the pair of shape features in the same relative place in their corresponding shape feature strings will represent the same character. The probability calculated for each shape feature pair is independent of the other pairs of shape features in the shape feature strings and independent of any position features. In addition, the system automatically generates a position feature probability (PFP) table. The PFP table is a one-dimensional array that contains one entry for each possible feature distance and that is indexed by feature distance. The "feature distance" between two position features is defined as the sum of the square of the distance between the starting points of the features and of the square of the distance between the ending points of the features. Each entry contains the probability that any two handwritten character prototypes that have the same number of strokes and that have a pair of position features in the same relative place in their corresponding position feature strings such that the feature distance between the pair of position features is equal to the index will represent the same character.

The system calculates the SFP matrix and the PFP table from a database of handwriting samples of characters. Each handwriting sample contains the shape and position feature strings corresponding to the sample handwritten characters. In one embodiment, the system calculates the shape probabilities for the SFP matrix by first counting an overall total number of times each possible pair of shape features occurs in samples with the same number of strokes ("sample length") and at the same relative place within their corresponding shape feature strings. The system then counts a matching total number of times that each possible pair of shape features occurs in samples with the same number of strokes, at the same relative place within their corresponding shape feature strings, and in which the samples represent the same character. The system then calculates the probability for each possible shape feature pair by dividing its matching total count by its overall total count. In this embodiment, the system calculates the overall and matching total counts by comparing each shape feature string of each sample with the shape feature string of every other sample of the same sample length. Based on this comparison, the system maintains a running count of the totals. One skilled in the art would appreciate that, in this embodiment, the number of comparisons is $o(n^2)$, where n is the number of samples. In a preferred embodiment as described below, the number of comparisons is $o(n)$.

In one embodiment, the system calculates the position probabilities for the PFP table by first counting an overall total number of times each feature distance occurs between each pair of position features in samples with the same sample length, the features of each pair having the same relative place within their corresponding position feature strings. The system then counts a matching total number of times that each feature distance occurs between each pair of position features in samples with the same sample length, at the same relative place within their corresponding position feature strings, and in which the samples represent the same character. The system then calculates the probability for each possible feature distance by dividing its matching total count by its overall total count.

FIG. 1 is a block diagram illustrating a preferred embodiment of the handwritten symbol recognition system of the present invention. The system includes a computer 101 and a user interface 102. The computer includes a central processing unit, memory, and storage device. The system also includes a symbol analyzer 103, character identifier 104, prototype database 105, SPF table 106, and PFP table 107. The user interface includes an input device 108 and an output device 109. Handwritten symbols are input by the user to the input device. The symbol analyzer normalizes the size of the input symbol, superimposes an input symbol onto a coordinate grid, identifies the shape features of the input symbol, calculates the starting and ending points of each stroke to generate the position feature of each stroke, and sends the shape and position feature strings to the character identifier. Using this information, the character identifier compares the input symbol to each character prototype in the character prototype database and calculates the probabilities that the input symbol matches each of the character prototypes stored in the character prototype database. The probabilities are calculated based on the SFP matrix and the PFP table. The character associated with the character prototype that has the highest probability is selected as the matching character.

In one embodiment of the present invention, an input handwritten Kanji character is compared to a large database of Kanji character prototypes and the handwritten Kanji character is identified as having the character identity of the character prototype with the highest calculated matching probability. Because the Kanji character prototype database contains a great number of character prototypes and because these are a large number of shape and position features defined in this embodiment, the present invention is illustrated with a simpler set of features and a smaller character prototype database.

Figure 2:
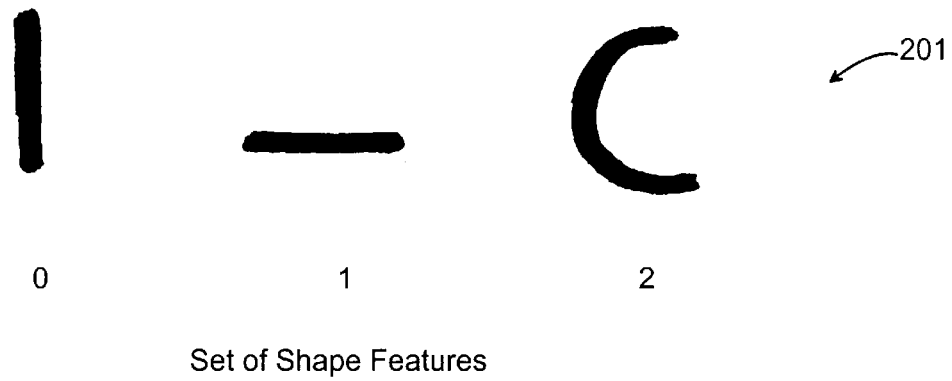
FIG. 2 shows the set of shape features and the alphabet.
Figure 2:
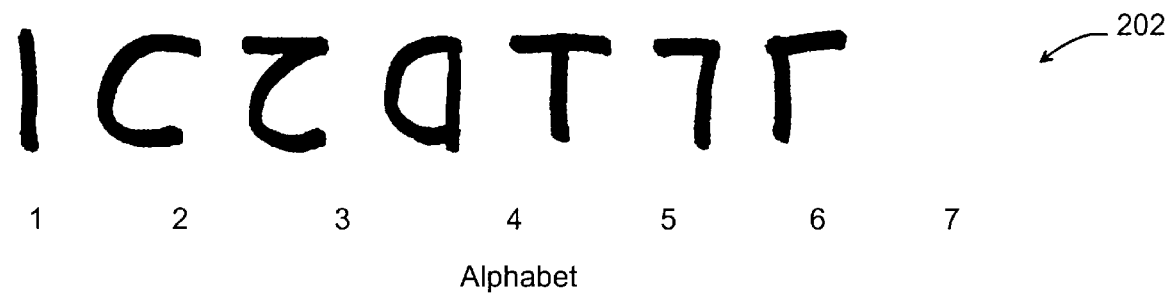

FIGS. 2–6 illustrate an example of the operation of the symbol analyzer and the character identifier that use the SFP matrix and the PFP table. FIG. 2 shows the set of shape features and the alphabet for this example. For simplicity of explanation, this example, rather than using the Chinese or Kanji alphabet, uses a simple alphabet 202 of seven characters comprised of one or two features from the set of three shape features 201. The three shape features consist of a vertical line, designated shape feature 0, a horizontal line, designated shape feature 1, and a curved line in the shape of a "C", designated shape feature 2. The alphabet, to which the input symbol and the character prototypes belong, consists of two one-stroke characters, characters 1 and 2, and five two-stroke characters, characters 3, 4, 5, 6 and 7.

Figure 3:
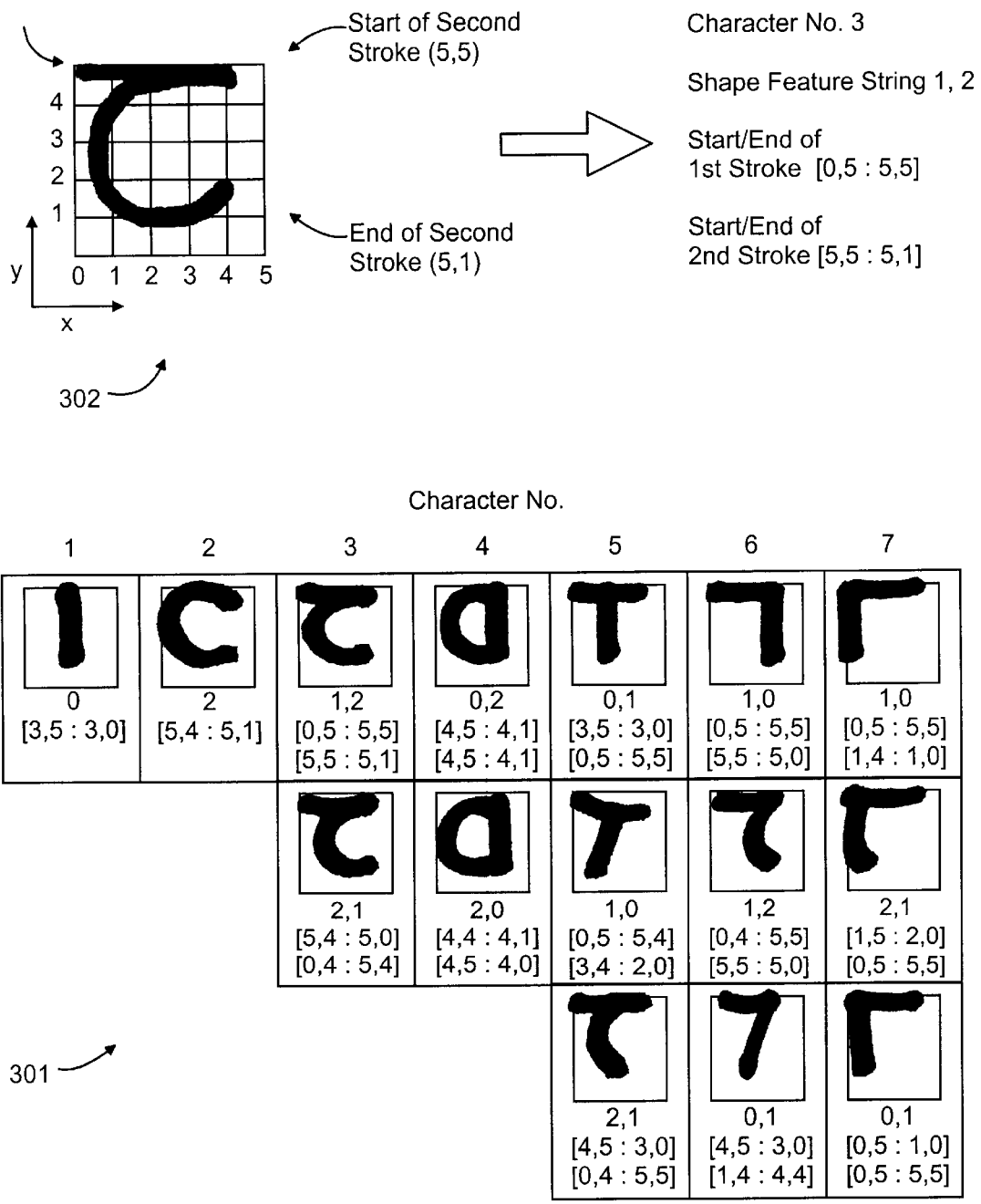
FIG. 3 illustrates the sample character prototype database.

FIG. 3 illustrates the sample character prototype database. The character prototype database 301 contains the prototypes for the seven-character alphabet. For each character in the alphabet, the database contains a character prototype for each possible shape feature string that represents that character. Each character prototype contains a shape feature string and a position feature string. For example, the first prototype of the character 3 has a shape feature string of "1,2" and a position feature string of "[0,5:5,5], [5,5:5,1]." The shape feature string of "1,2" indicates that the first stroke in the prototype has a shape feature of a horizontal line and the second stroke in the prototype has a shape feature of "C." The position string feature is illustrated in the 6×6 grid 302. The first prototype for the character 3 is shown superimposed on the grid. The starting and ending points of the first stroke are (0,5) and (5,5), which are represented in the position feature string as "[0,5:5,5]," and the starting and ending points of the second stroke are (5,5) and (5,1), which are represented in the position feature string as "[5,5:5,1]." The sample prototype database contains two prototypes for the character 3. In the second prototype, the horizontal and "C" strokes were written in reverse ordering from the first prototype, but the starting and ending points of the strokes are about the same as in the first prototype. Both prototypes are in the column labeled character 3 in the prototype database. Character 5 has three prototypes. The first prototype corresponds to writing a character, which looks like a "T," by first writing a horizontal stroke at the top followed by a vertical stroke. Alternatively, these strokes can be written in reverse order as represented by the second prototype. A third possible way of writing the "T," possibly the result of sloppy handwriting, is to write a curved stroke in place of the vertical stroke as represented by the third prototype.

Figure 4:
FIG. 4 illustrates a sample shape feature probability matrix and a sample position feature probability table.

FIG. 4 illustrates a sample shape feature probability matrix and a sample position feature probability table. The shape feature probability (SFP) matrix 401 is a square matrix with one column and row per shape feature. Each entry of the SFP matrix contains the probability that any two handwritten characters that have the same number of strokes and that have the pair of shape features in the same relative place within their shape feature strings will represent the same character. Each probability is independent of the other pairs of shape features in the shape feature strings and independent of any position features. In a preferred embodiment, the values stored in the SFP table are integer values derived from the probability by the following formula.

$$-10 * \frac{\ln(probability)}{\ln(2)} + 0.5$$

This derivation allows the values to be added, rather than multiplied, as would occur for unmodified probabilities. When the character identifier compares an input symbol ("the unknown character") to a character prototype from the database, it compares each shape feature in the shape feature string representing the unknown character to its corresponding shape feature in the shape feature string representing the character prototype. If, for example, the first shape feature of the unknown character is shape feature 0, and the first shape feature of the character prototype is shape feature 1, then the probability that the unknown character matches the character prototype based solely on comparison of the shapes of the first strokes is extracted from the SFP matrix by indexing into the matrix with 0 and 1 to retrieve the probability value 27.

The position feature probability (PFP) table 402 contains one entry for each possible feature distance. Each entry of the PFP table contains the probability that any two handwritten characters that have the same number of strokes and that have a pair of position features in the same relative place in their corresponding position feature strings such that the feature distance between the pair of position features is equal to the index will represent the same character. In a preferred embodiment, the values stored in the PFP table are derived as described above. To use the PFP table, the character identifier generates the feature distance between each pair of position features in the position feature strings of the unknown character and the character prototype. Because the sample grid on which characters are superimposed is rather small, the number of possible feature distances is also small. For this 5×5 grid, the largest possible distance between any two points is equal to the distance between the points (0,0) and (5,5), and the squared distance between these two points is $$\sqrt{5^2 + 5^2}^2$$

or 50. The largest feature distance would be found for two strokes with position features of "[0,0:5,5]" and "[5,5:0,0]" giving a feature distance of 50+50=100. The computed feature distance for a pair of corresponding position features is used to index into the PFP table.

Figure 5:
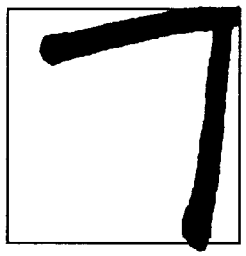
FIG. 5 illustrates the comparison of an unknown character to a prototype.
Figure 5:
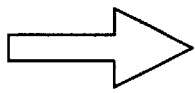
Figure 5:

FIG. 5 illustrates the comparison of an example unknown character to a prototype. The shape feature string for the unknown character is "1,0" which corresponds to writing a horizontal line at the top of the character followed by a vertical line. The starting and ending points of the horizontal line are (1,4) and (5,5), and the starting and ending points of the vertical line are (5,5) and (4,0). The two-stroke character prototype that has the greatest calculated probability of matching the unknown character is identified as the matching character. In this example, the unknown character and the first prototype for character 3 are shown. The character identifier calculates two intermediate probability values: the first one using the SFP matrix, and the second one using the PFP table. To calculate the shape intermediate probability value, the character identifier takes the first shape feature from the shape feature string of the unknown character, shape feature 1, and the first shape feature from the shape feature string of the character prototype, shape feature 1, and uses those two shape features to index into the SFP matrix. The value in the SFP matrix at the entry indexed by (1,1) is 17. Then, the character identifier takes the second shape feature from the shape feature string of the unknown character, shape feature 0, and the second shape feature from the shape feature string of the character prototype, shape feature 2, and uses these two shape features to index into the SFP matrix to retrieve the value 26. These two values are then summed to 43.

To calculate the position intermediate probability value, the character identifier calculates the distance feature between the first position feature in both the unknown character and the character prototype to give a value of 2. Using that value as an index into the PFP table, the character identifier extracts the probability value 13. The character identifier then calculates the distance feature between the second position feature of the unknown character and the second position feature of the character prototype to again give a value of 2. Using that value as an index into the position feature probability table, the character identifier then extracts 13. The character identifier then adds those two probability values for the pair of position features for a total of 26.

The character identifier then adds the intermediate probability values 41 and 26 to give the final matching probability value of 67. Various linear combinations of the two intermediate probabilities are possible. In the preferred embodiment, desirable results are obtained when the two intermediate probabilities are simply added together. The lower the matching probability value, the more likely that the unknown character matches the character prototype. FIG. 6 illustrates the shape and position intermediate probability values for the sample unknown character and the two-stroke prototypes. Table 601 contains the shape intermediate probabilities, table 602 contains the position intermediate probabilities, and table 603 contains the final match probabilities. The unknown character most nearly matches the first character prototype of the character 6, as indicated by the lowest matching probability value of 54 in the final match probability table 603. The next most likely match is a variation of character 6, that is, the second character prototype with a matching probability of 57. Indeed, one would conclude, by visual comparison of the unknown handwritten character with each character prototype in the character prototype database, that the handwritten character represents character 6 from the alphabet.

The shape feature probability ("SFP") matrix and the position feature probability ("PFP") table used by the character identifier are themselves automatically calculated from a database of handwritten character samples by a computer system. Such automatic generation has important advantages. A very large sample database can be gathered, and the SFP matrix and the PFP table generated will encompass the many possible ways in which each character can be written. For example, different orders of writing the strokes comprising a character, different feature combinations by which a character can be represented, and different sizes and positionings of features within the character can all be encompassed, without the need for tedious attempts to manually list and categorize the differences. The larger the database, the better the statistical significance of the calculated probabilities. Another advantage of automatic generation of the SFP and the PFP is that system designers can easily try a variety of different sets of shape features in the handwriting recognition system in order to find an optimal set. Prior art trial and error methods for generating probability tables were far too slow to allow for extensive shape feature set analysis.

Still another advantage of automatic SFP matrix and PFP table generation is that the generated probabilities are actual mathematical probabilities of character matches, rather than mere estimations of the general likelihood of substitution of one feature for another. Because they are mathematical probabilities, the probabilities extracted from the SFP matrix and the PFP table can be combined in a mathematically meaningful way. In the prior systems, the sum of the distances between starting and ending points of corresponding features is used directly as one comparison value, and values from the shape feature matrix are used as a second value. Because neither value in the prior art system is a probability, it is likely that they cannot be linearly combined to reflect a reasonable estimate of the match probability.

Generating the Shape Feature Probability Matrix

Figure 7:
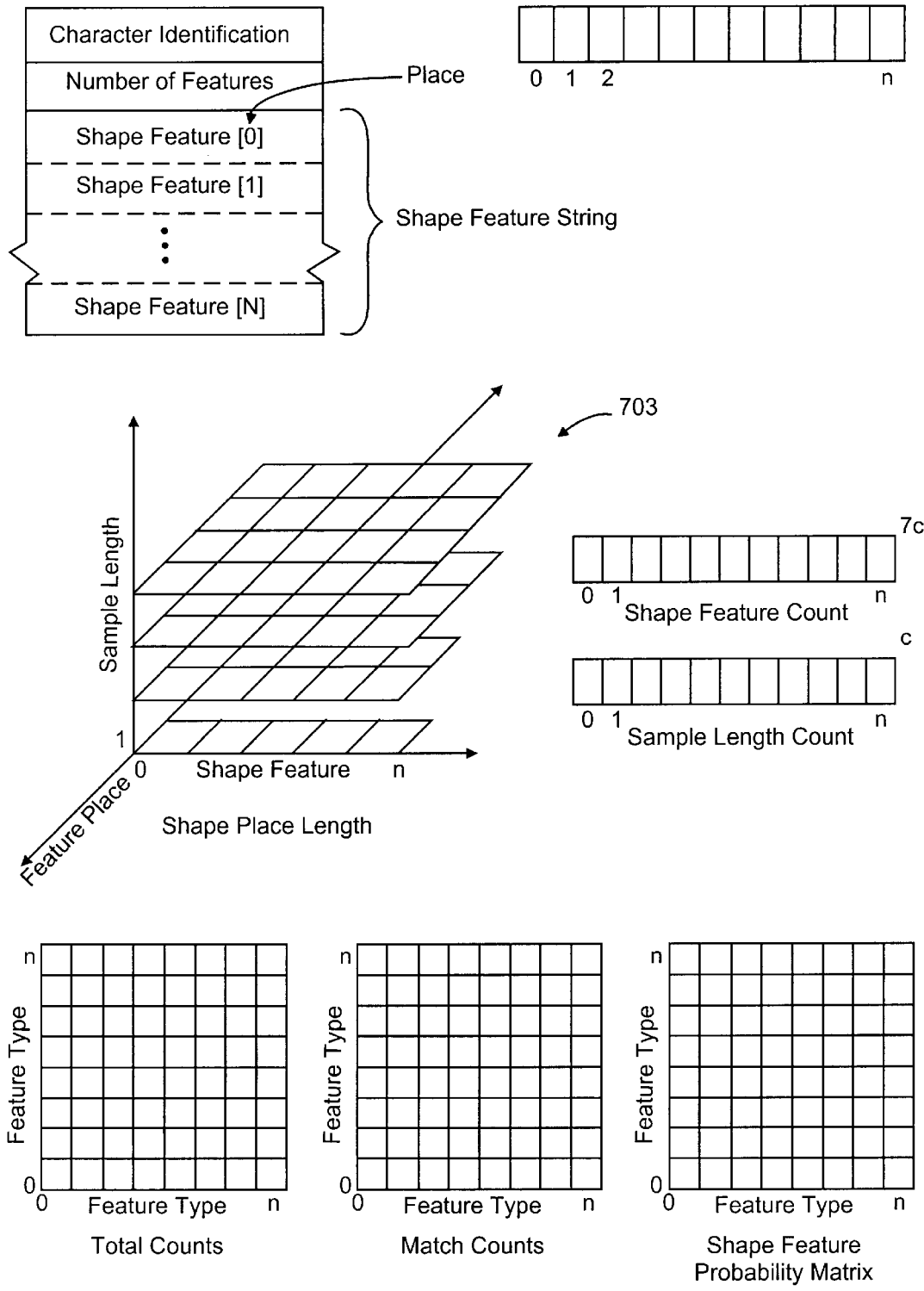
FIG. 7 is a diagram of the data structures used to generate the SFP matrix.

The system automatically calculates the SFP matrix using several data structures. FIG. 7 is a diagram of the data structures used to generate the SFP matrix. The sample data record 701 contains the data for one handwritten character sample and includes the character identification of the sample, the number of strokes in the sample, and the shape feature string of the sample. The Samples array 702 is an array of sample data records which contains all the samples read into memory from the sample database. The ShapePlaceLength array 703 is a three-dimensional array shown as vertically stacked planes of two-dimensional arrays. The array contains one plane for each possible sample length, from 1 to the largest sample length of any sample character. Each two-dimensional plane is indexed by shape feature and feature place. Feature place is a position within the shape feature string, the first shape feature in the string has a feature place of 0, the second shape feature in the string has a feature place of 1, and so on. Each entry of each plane contains the total number of occurrences of a particular feature shape at a particular place within the shape feature strings of a set of sample characters having a particular number of strokes ("sample length"). The ShapeFeatureCount array 704 is indexed by shape feature. Each entry contains the number of times that the shape feature occurs in the shape feature strings of a set of samples. The SampleLengthCount array 705 is indexed by sample length. Each entry contains the number of times a particular sample length occurs in a set of samples. The square matrices, TotalCounts 706 and MatchCounts 707, are indexed in both dimensions by shape feature and are used to accumulate the number of particular shape feature pairs that occur in the samples. The square matrix, SFP matrix 708, contains the final calculated probabilities.

FIGS. 8–12 are diagrams that illustrate the generating of the SFP matrix. FIG. 8 is diagram of a sample data character database from which the system generates the SFP matrix. The data base contains seven handwriting samples for each of the seven characters. For example, the character that is similar to a "T" is shown in column 5. There is a handwriting sample of the character in each of the 7 rows. The sample in row 4 and column 5 contains the shape feature string "2,1" and the position feature string "[4,5:3,0], [0,4:5,5]".

Figure 9:
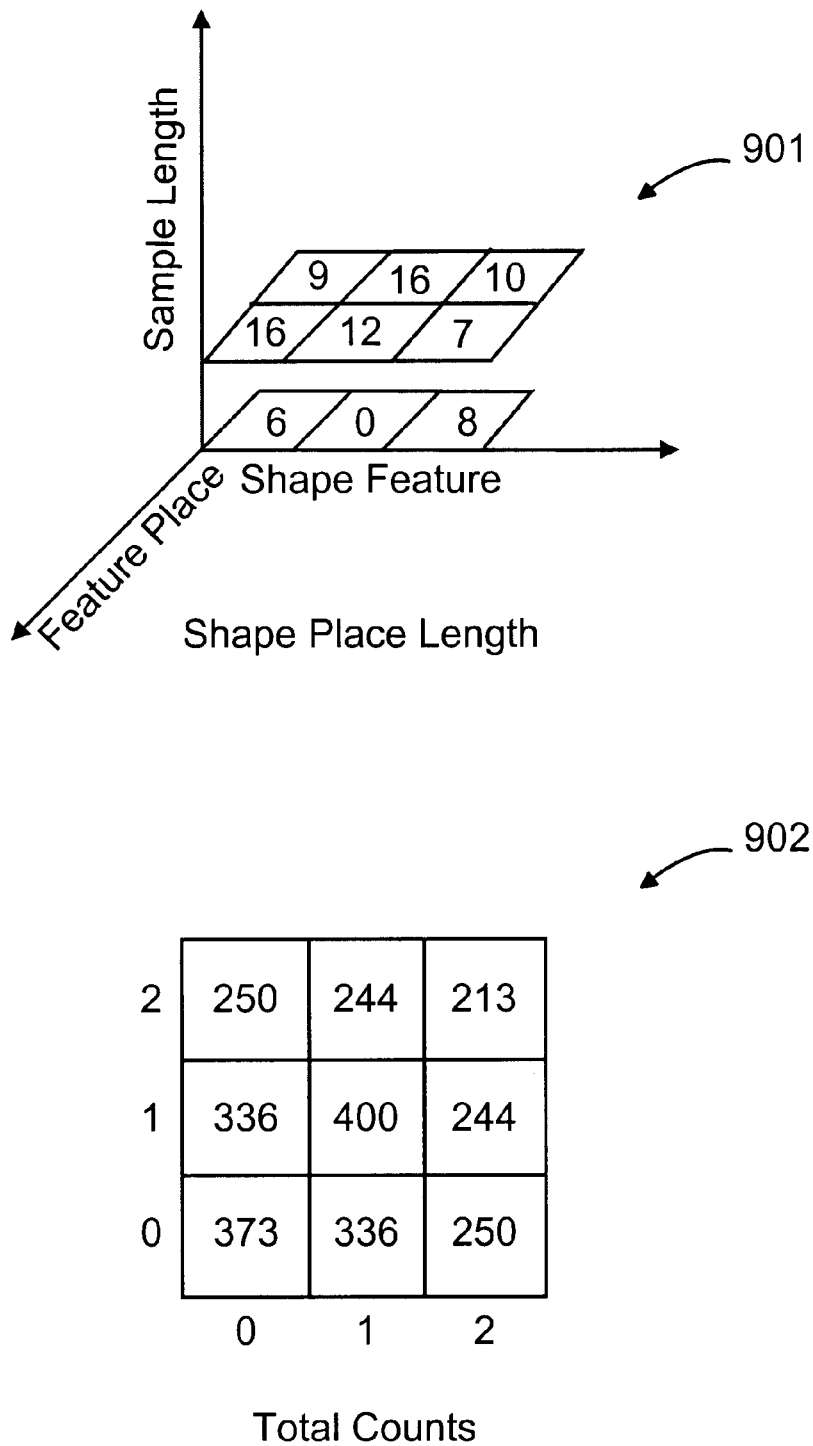
FIG. 9 shows the ShapePlaceLength array that is generated from the sample character database.

The system first generates the ShapePlaceLength array, and then uses the ShapePlaceLength array to generate the TotalCounts, MatchCounts, and SFP matrices. By use of the ShapePlaceLength array, the system can generate the SFP matrix in linear time. FIG. 9 shows the ShapePlaceLength array that is generated from the sample character database. To generate the ShapePlaceLength array, the system selects each sample in the database and retrieves its sample length and shape feature string. Then, for each shape feature in the retrieved shape feature string, the system increments the entry in the ShapePlaceLength array that is indexed by the shape feature, by the place of the shape feature in the shape feature string, and by the sample length. When the shape features in the one-stroke characters are counted, for example, there are 6 occurrences of shape feature 0, no occurrences of shape feature 1, and 8 occurrences of shape feature 2. The 6, 0, and 8 in the lower plane of the ShapePlaceLength array 901 correspond to these counts. Similarly, there are 16 occurrences of shape feature 0 in the first place of the shape feature strings of all two-stroke characters, 12 occurrences of shape feature 1 in the first place of the shape feature strings of all two-stroke characters, and so on. These counts are shown in the upper plane of the ShapePlaceLength array 901.

Figure 10:
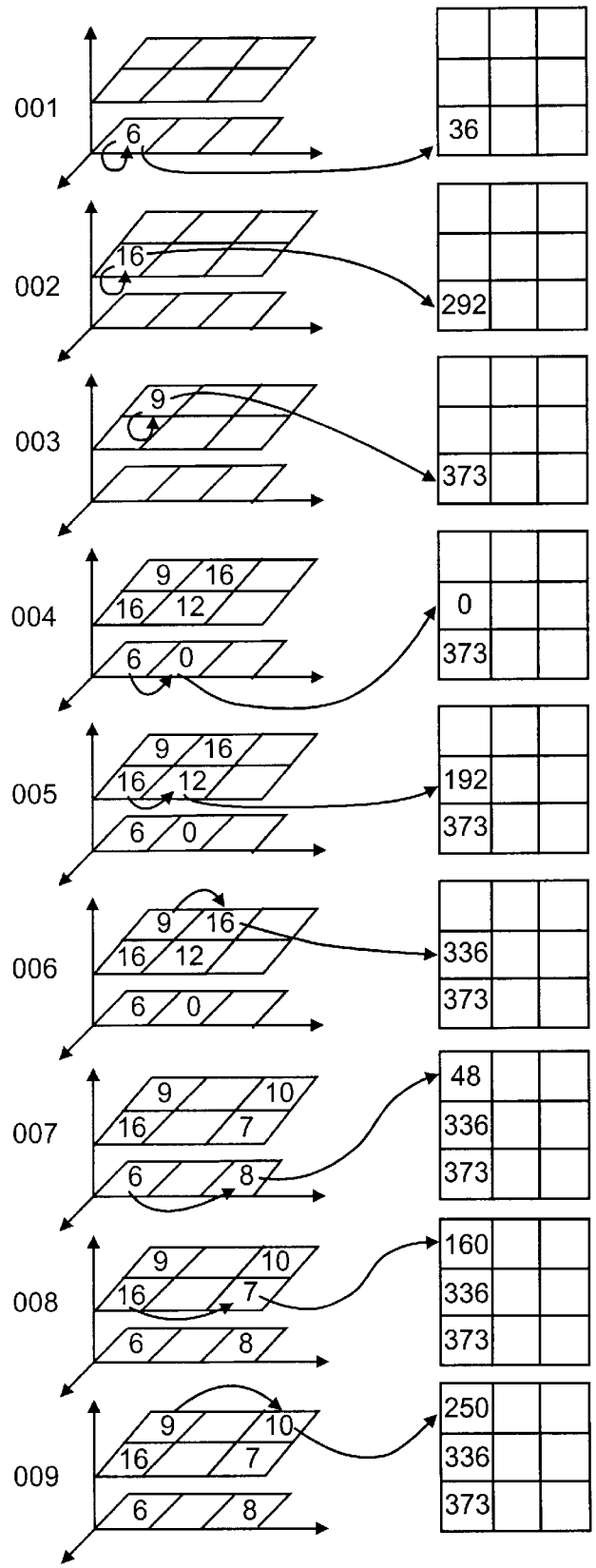
FIG. 10 shows the generation of the TotalCounts matrix.

After generation of the ShapePlaceLength array 901, the system then generates the TotalCounts matrix 902. FIG. 10 shows the generation of the TotalCounts matrix. Each entry in the TotalCount matrix contains the overall total number of times each possible pair of shape features occurs in samples with the same number of strokes and at the same relative place within the corresponding shape feature strings. For example, entry (0,0,1) of the ShapePlaceLength array indicates that shape feature 0 occurs 6 times in place 0 of shape feature strings of length 1. Thus, the total number of pairs of shape feature 0 that occur in place 0 of shape feature strings of length 1 is 36 (6*6). Similarly, entry (0,0,2) of the ShapePlaceLength array indicates that shape feature 0 occurs 16 times in place 0 of shape feature strings of length 2. Thus, the total number of pairs of shape feature 0 that occur in place 0 of shape feature strings of length 2 is 256 (16*16). Finally, entry (0,1,2) of the ShapePlaceLength array indicates that shape feature 0 occurs 9 times in place 1 of shape feature strings of length 2. Thus, the total number of pairs of shape feature 0 that occur in place 1 of shape feature strings of length 2 is 81 (9*9). To generate the overall total that pairs of shape feature 0 occur in the same relative place in pairs of shape feature strings, the system adds 36, 256, and 81 to arrive at a total count of 373. The illustrations 1001, 1002, and 1003 show the calculation of this total.

To calculate the number of times that pairs of shape feature 0 and shape feature 1 occur in the same place within shape feature strings of the same length, the system first retrieve the entries (0,0,1) and (1,0,1), which indicate that shape feature 0 occurs 6 times and shape feature 1 occurs 0 times at place 0 of shape feature strings of length 1. Thus, the total number of pairs of shape feature 0 and shape feature 1 that occurs in place 0 of shape strings of length 1 is 0 (6*0). Similarly, entries (0,0,2) and (1,0,2) indicate that shape feature 0 occurs 16 times and shape feature 1 occurs 12 times in place 0 of shape feature strings of length 2. Thus, the total number of pairs of shape feature 0 and shape feature 1 that occurs in place 0 of shape strings of length 1 is 192 (16*12). The system continues calculating the entries for the TotalCount matrix as shown by illustrations 1004–1009. The TotalCounts matrix 902 contains the resulting total counts. The value 373 in entry (0,0) indicates that when all possible combinations of samples of the same length are compared, shape feature 0 in one sample is in the same relative place as a shape feature 0 in another sample a total of 373 times.

Figure 11:
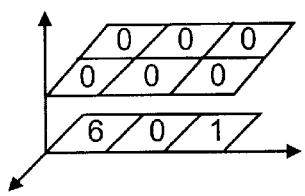
FIG. 11 illustrates the generation of the MatchCounts matrix
Figure 11:
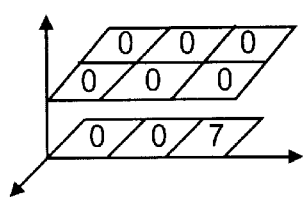
Figure 11:
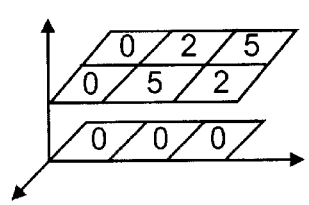
Figure 11:
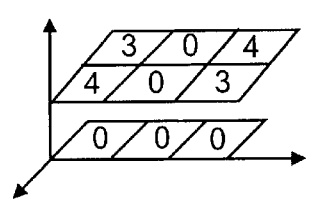
Figure 11:
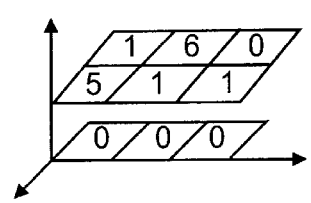
Figure 11:
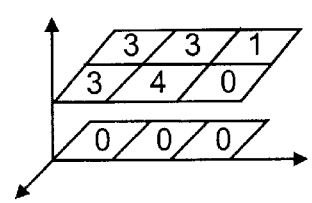
Figure 11:
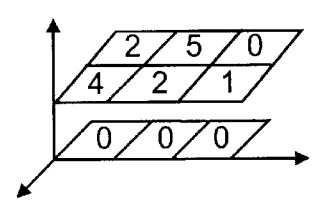

After the TotalCounts matrix is generated, the system generates the MatchCounts matrix. FIG. 11 illustrates the generation of the MatchCounts matrix. The system processes the set of samples for each character identification separately as follows. First, the system selects all the samples for the selected set of character identification. The system then generates a new ShapePlaceLength array for the selected set of samples. The system then calculates the number of times that various pairs of shape features are in the same place within samples of the same length. For example, illustration 1101 shows the new ShapePlaceLength array along with the running total of the MatchCounts matrix that indicates that shape feature 0 occurs 6 times in place 0 in shape feature strings of length 1 that have a character identification of 1. Similarly, shape feature 2 occurs 1 time in place 0 in shape feature strings of length 1 that have a character identification of 1. The system then generates the contribution of the MatchCounts matrix for character 1 by multiplying the entries in a similar manner as was done for the TotalCounts matrix. The system performs a similar calculation on the set of sample characters corresponding to the other character identifications and adds their resulting values into the MatchCount matrix as shown in illustrations 1102–1107. FIG. 12 shows the final values for the TotalCounts, MatchCounts, and the SFP matrices.

The system generates the SFP matrix from the MatchCounts and TotalCounts matrices. Each value in the Match-Counts matrix is divided by the corresponding value of the TotalCounts matrix. For example, the value at (0,0) in MatchCounts, which is 115, is divided by the value at (0,0) in TotalCounts matrix, which is 373. If the result is 0, or is undefined, the corresponding element of the SFP matrix is assigned the value 255, which represents the lowest matching probability. Otherwise, the natural log of the result of the above division is divided by the natural log of 2, that result is multiplied by −10, the result of the multiplication step is added to 0.5, and the sum is truncated to an integer value. This calculated value is placed in the corresponding entry of the SFP matrix. Continuing with the above example, SFP matrix entry (0,0) is assigned the value:

$$-10 \frac{\ln(115/373)}{\ln(2)} + 5 = 17$$

The division produces the actual probability that two samples match if, at a given position, both of their shape feature strings contain feature shape 0. Logarithms are used so that probabilities for feature shapes can be accumulated by addition. The multiplication by −10 makes the values reasonably sized positive integers. A probability of 50% ends up represented as 10. A probability of 25% ends up represented as 20. The higher the value in the SFP matrix, the lower the probability that the two samples match.

Figure 13:
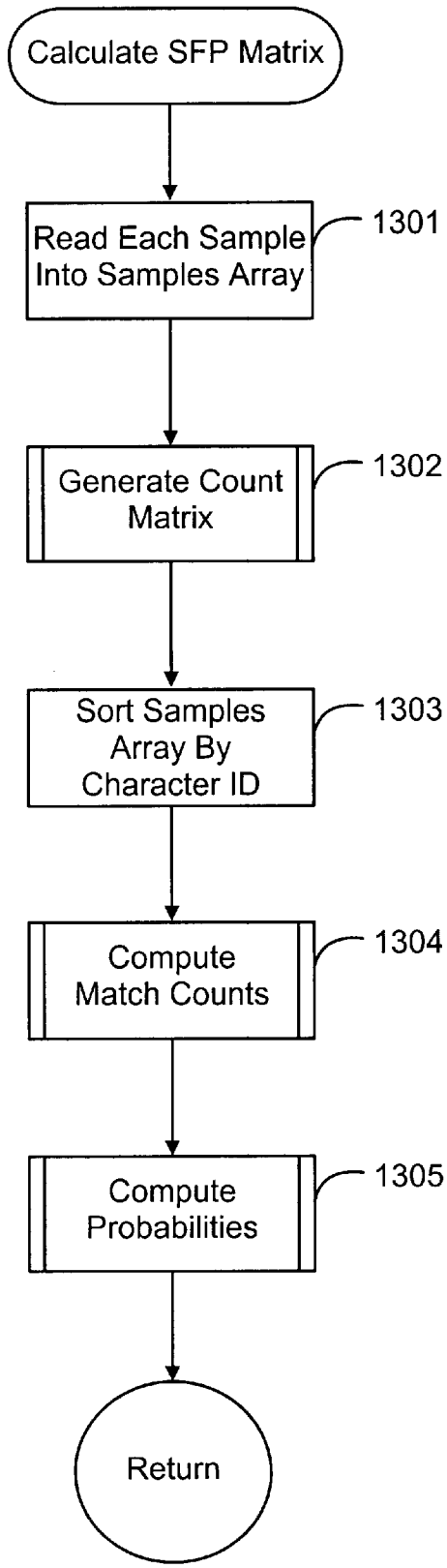
FIG. 13 is a flow diagram of the CalculateSFPMatrix procedure.

FIG. 13 is a flow diagram of the CalculateSFPMatrix procedure. This procedure is passed a database of handwritten character samples and calculates the values for a shape feature probability ("SFP") matrix. In step 1301, the procedure reads each sample stored in the database of handwritten character samples into memory. In step 1302, the procedure calls the routine GenerateCountMatrix passing the samples. The called routine calculates the values for the TotalCounts matrix from the passed samples. In step 1303, the samples in memory are sorted by character identification, so that all samples of the first character identification are listed first, all samples of the second character identification are listed second, and so on. This sorting allows for rapid selection of samples with the sample character identification. In step 1304, the routine calls the routine ComputeMatchCounts to calculate the values for the MatchCount matrix. In step 1305, the routine calls the routine ComputeProbabilities to generate the SFP matrix from the TotalCount and MatchCount matrices.

Figure 14:
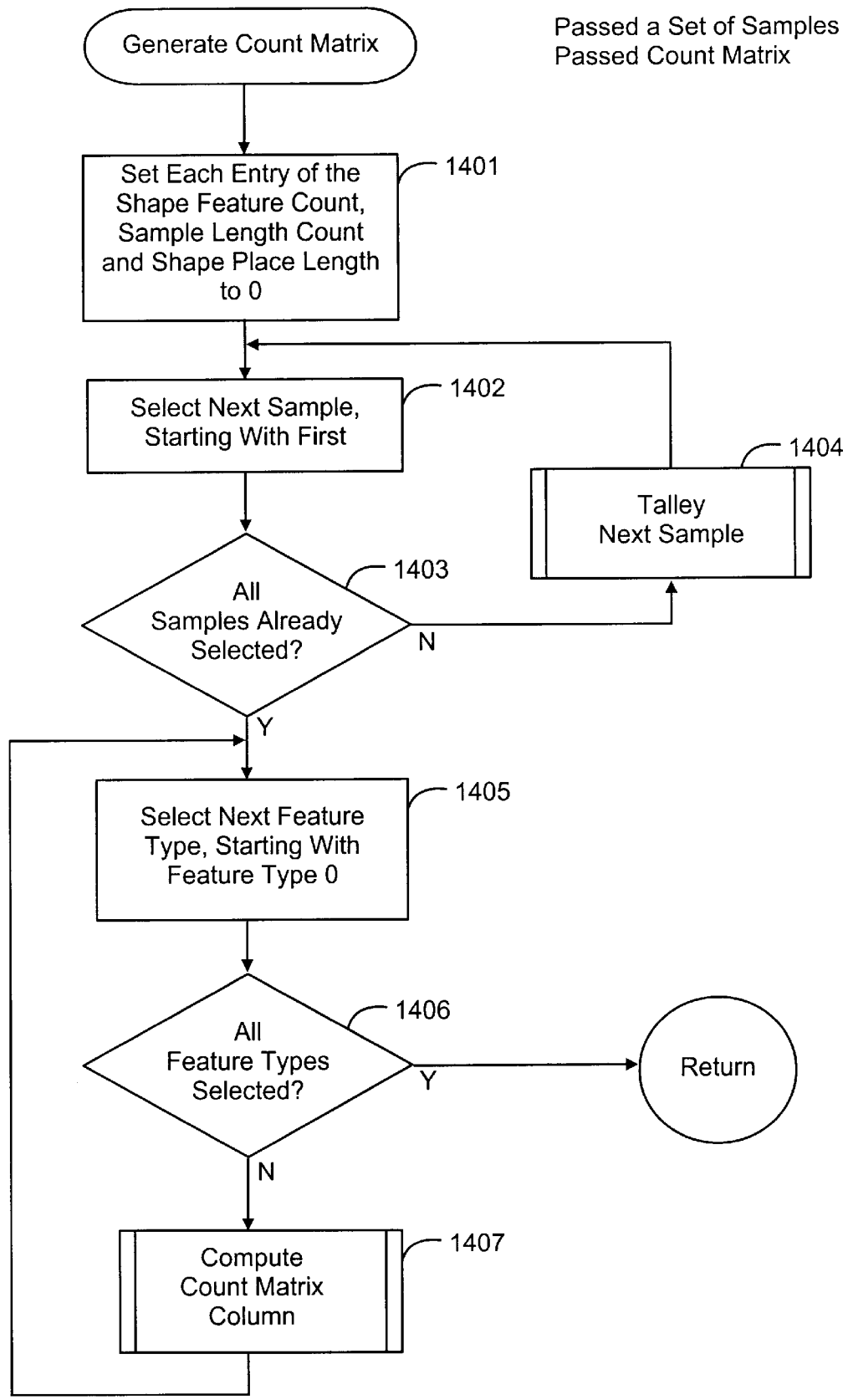
FIG. 14 is a flow diagram for the routine GenerateCountMatrix

FIG. 14 is a flow diagram for the routine GenerateCountMatrix. This subroutine determines the number of times each possible pair of shape features occurs at the same relative place within the feature strings of all possible pairs of samples in a passed set of samples. A direct implementation of this routine would involve actually performing all the possible pair-wise comparisons of the sample characters, with a time of execution proportional to the square of the number of samples in the passed sample set (i.e., σ(n²)). This routine is, by contrast, proportional in time of execution to the number of samples in the passed sample set (i.e., σ(n)). As described above, this routine uses the ShapePlaceLength array when generating the counts. This routine is passed a set of samples and a count matrix in which to store the result of the calculation. The count matrix is a square matrix whose both dimensions are indexed by shape features. In step 1401, the routine sets each entry of the ShapeFeatureCount, SampleLengthCount, and ShapePlaceLength arrays to 0. Note, however, that the passed count matrix is not cleared, so that the routine can be repeatedly called to accumulate results in a given count matrix. In steps 1402–1404, the routine stores in the ShapePlaceLength the counts of the shape features of each sample in the passed set of samples array by repeatedly calling routine TallyNextSample. In step 1402, the routine selects the next sample starting with the first sample in the passed sample set. In step 1403, if all the samples have already been selected, then the routine continues at step 1405, else the routine continues at step 1404. In step 1404, the routine invokes the routine TallyNextSample, which retrieves each shape feature from the shape feature string of the selected sample and increments the entry in the ShapePlaceLength array that is indexed by the retrieved shape feature, the place of the retrieved shape feature within the shape feature string, and the length of the sample. The routine then loops to step 1402 to select the next sample. In steps 1405–1407, the routine uses the ShapePlaceLength array to compute the number of times each possible shape feature pair occurs in the passed sample set and stores these compute values in the passed count matrix. In step 1405, the routine selects the next shape feature starting with shape feature 0. In step 1406, if all the shape features have already been selected, then the routine returns, else the routine continues at step 1407. In step 1407, the routine invokes the routine ComputeCountMatrixColumn, which totals the shape feature pair combinations in which the first shape feature of the pair is the selected shape feature. The routine then loops to step 1405 to select the next shape feature.

Figure 15:
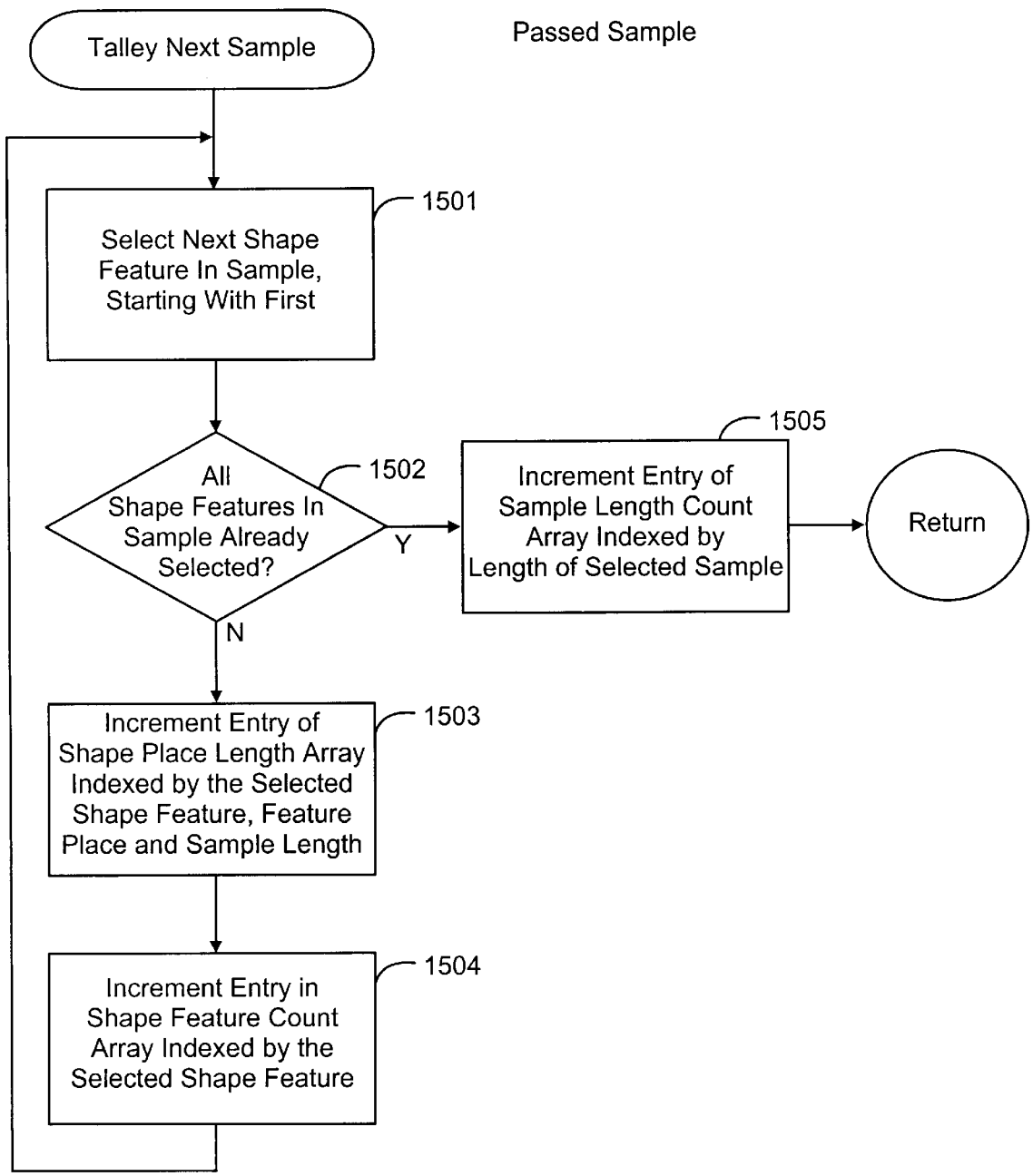
FIG. 15 is a flow diagram for the TallyNextSample routine.

FIG. 15 is a flow diagram for the TallyNextSample routine. This routine is passed a sample and updates the ShapePlaceLength array to reflect the occurrence of each shape feature in the shape feature string of the passed sample. The routine selects each shape feature and increments the entry of the ShapePlaceLength array that is indexed by the selected shape feature, the place of the selected shape feature within the shape feature string, and the length of the sample. The routine also updates the ShapeFeatureCount and the SampleLengthCount arrays, which are used to optimize subsequent calculations. In step 1501, the routine selects the next shape feature in the sample starting with the first shape feature. In step 1502, if all the shape features of the passed sample have already been selected, then the routine continues at step 1505, else the routine continues at step 1503. In step 1503, the routine increments the entry of ShapePlaceLength array that is indexed by the selected shape feature, by the place of the selected shape feature within the shape feature string, and by the length of the sample. In step 1504, the routine increments the entry of the ShapeFeatureCount array indexed by the selected shape feature and loops to step 1501 to select the next shape feature. In step 1505, the routine increments the entry of the SampleLengthCount array indexed by the sample length and returns.

Figure 16:
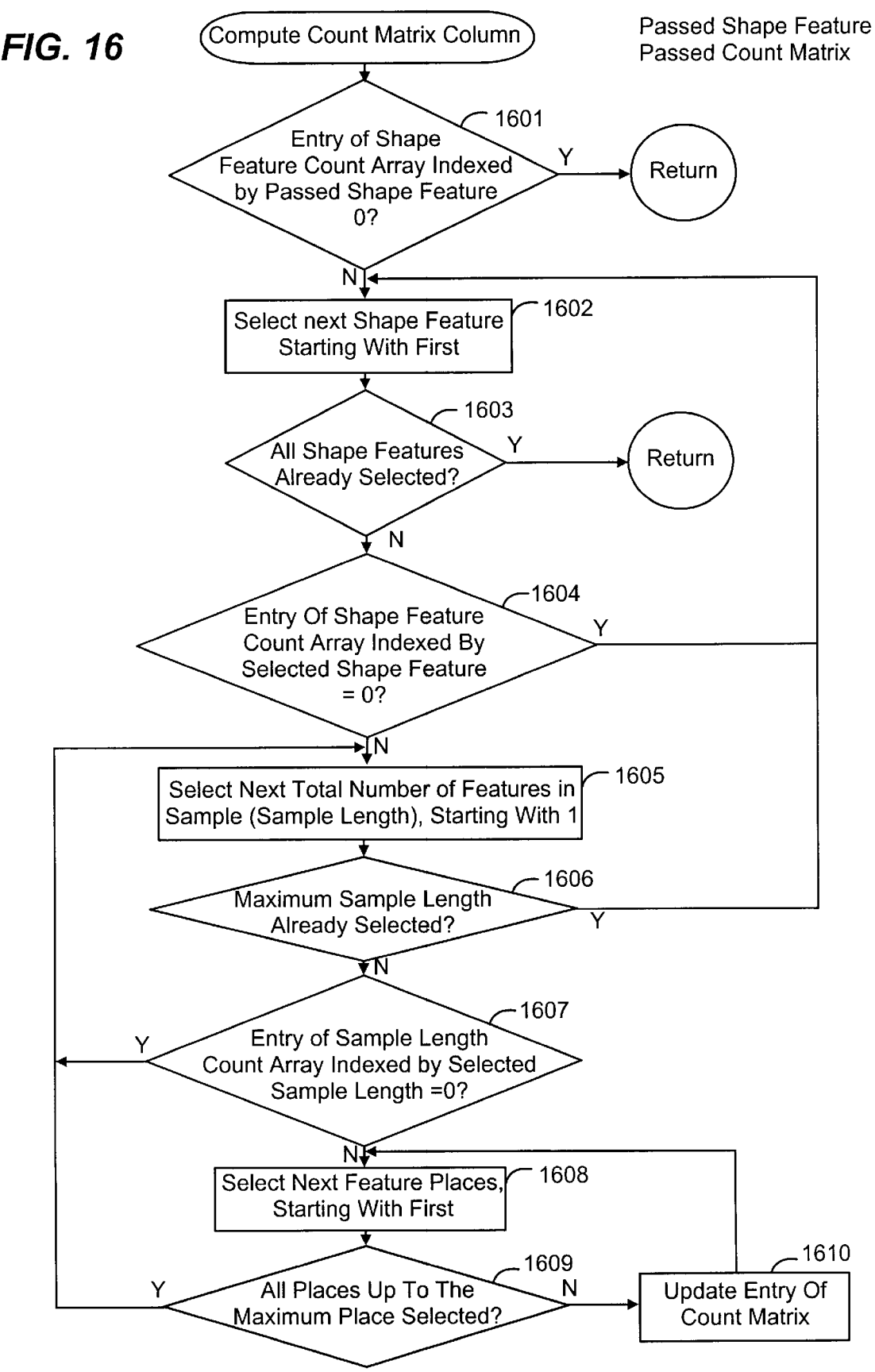
FIG. 16 is a flow diagram of the ComputeCountMatrixColumn routine.

FIG. 16 is a flow diagram of the ComputeCountMatrixColumn routine. This routine is passed a shape feature, the ShapePlaceLength array, and a count matrix. The routine updates the column of the count matrix indexed by the passed shape feature. The routine calculates the number of times the passed shape feature occurs as the first shape feature in each possible pair of shape features at particular places in the shape feature strings of samples of equal length in the set of samples from which the ShapePlaceLength array was derived. In step 1601, if the entry of the ShapeFeatureCount array indexed by the passed shape feature is 0, then the routine returns, else the routine continues at step 1602. This test is an optimization to avoid unnecessary processing when the passed feature does not occur in any of the samples used to generate the ShapePlaceLength array. In steps 1602–1610, the routine loops selecting each possible shape feature for use as the index of an entry of the column of the count matrix that is indexed by the passed shape feature. In step 1602, the routine selects the next shape feature, starting with the first shape feature. In step 1603, if all the shape features have already been selected, then the routine returns, else the routine continues at step 1604. In step 1604, if the entry of ShapeFeatureCount array indexed by the selected shape feature is 0, then the routine loops to step 1602 to select the next shape feature, else the routine continues at step 1605. This test is an optimization to avoid further processing when the selected shape feature does not occur in any of the samples used to generate the ShapePlaceLength array. In steps 1605–1610, the routine loops selecting each sample length and for each selected sample length, calculates the number of times that the passed shape feature and the selected shape feature are in corresponding places in shape feature strings of that sample length. In step 1605, the routine selects the next sample length, starting with the first sample length. In step 1606, if the maximum sample length has already been selected, then the routine loops to step 1602 to select the next shape feature. In step 1607, if the entry of the SampleLengthCount array indexed by the selected sample length is 0, then the routine loops to step 1605 to select the next sample length, else the routine continues at step 1604. This test is an optimization to avoid further processing when the selected sample length does not occur in any of the samples used to generate the ShapePlaceLength array. In steps 1608–1610, the routine loops selecting each feature place and updating the entry of the count matrix indexed by the passed shape feature and the selected shape feature. In step 1608, the routine selects the next feature place starting with the first. In step 1609, if all the places up to the selected sample length have already been selected, then the routine loops to step 1605 to select the next sample length, else the routine continues at step 1610. In step 1610, the routine extracts two values in the plane of the ShapePlaceLength array indexed by the selected sample length. One value is extracted from the entry indexed by the passed shape feature, by the selected feature place, and by the selected sample length and the other value is extracted from the entry indexed by the selected shape feature, by the selected feature position, and by the selected sample length. The routine multiplies the two extracted values together, and then adds that sum to the entry of the count matrix indexed by the passed shape feature and the selected shape feature. The routine then loops to step 1608 to select the next feature place.

Figure 17:
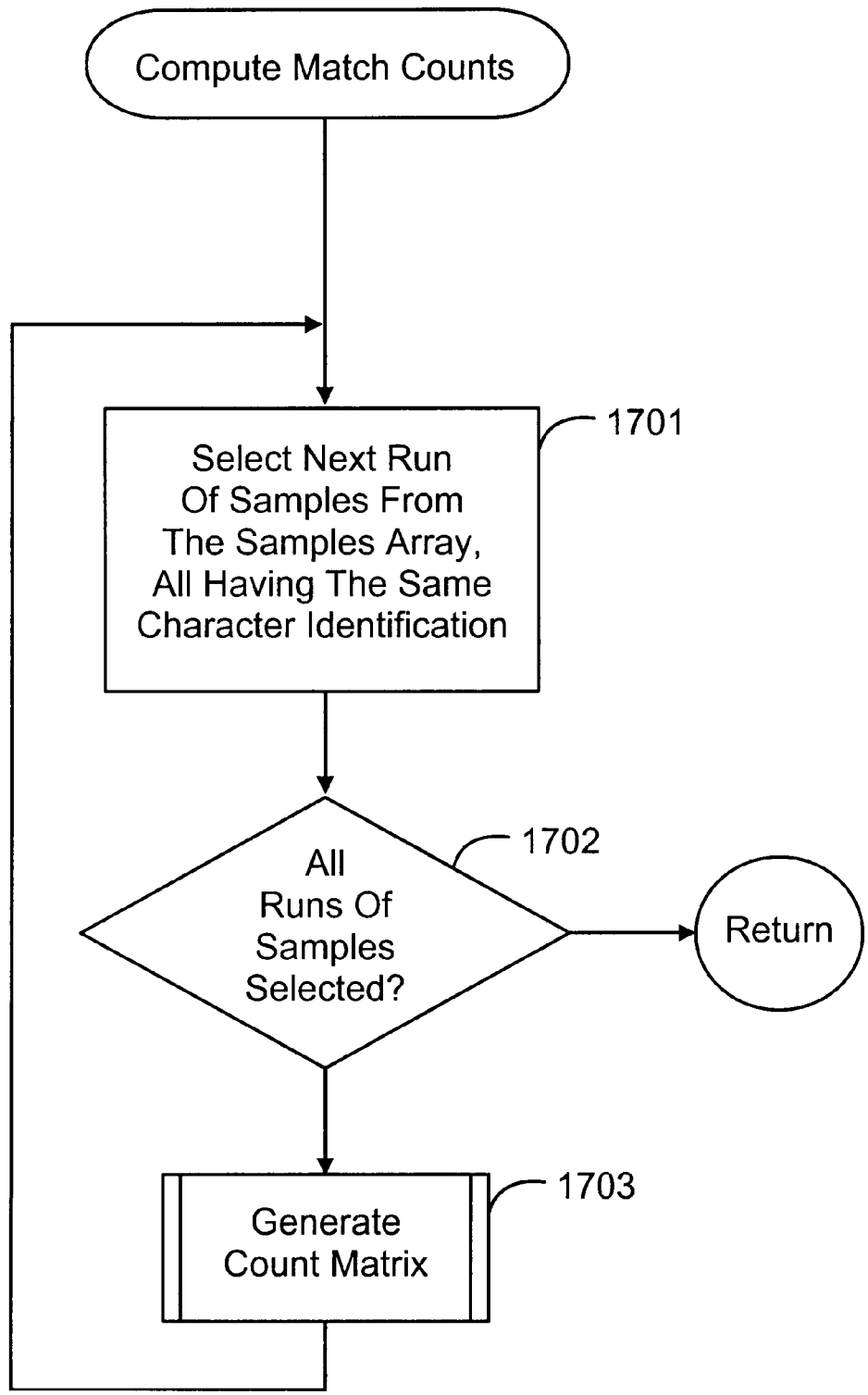
FIG. 17 is a flow diagram for the routine ComputeMatchCounts.

FIG. 17 is a flow diagram for the routine ComputeMatchCounts. This routine generates the MatchCount matrix. This routine determines the number of times each possible pair of shape features occurs in all possible pairs of samples in a set of samples that have the same sample length and the same character identification. The routine is passed the set of samples. For each character identification, the routine selects all the samples with that character identification and updates the MatchCount matrix by invoking the GenerateCountMatrix. In step 1701, the routine selects all the samples for a character identification starting with the first character identification. In step 1702, if the samples for all the character identification have already been selected, then the routine returns, else the routine invokes the routine GenerateCountMatrix passing the MatchCount matrix and then loops to step 1701 to select the next set of samples. The result of iterative calls to the routine GenerateShapeMatrix is accumulated in the MatchCount matrix.

Figure 18:
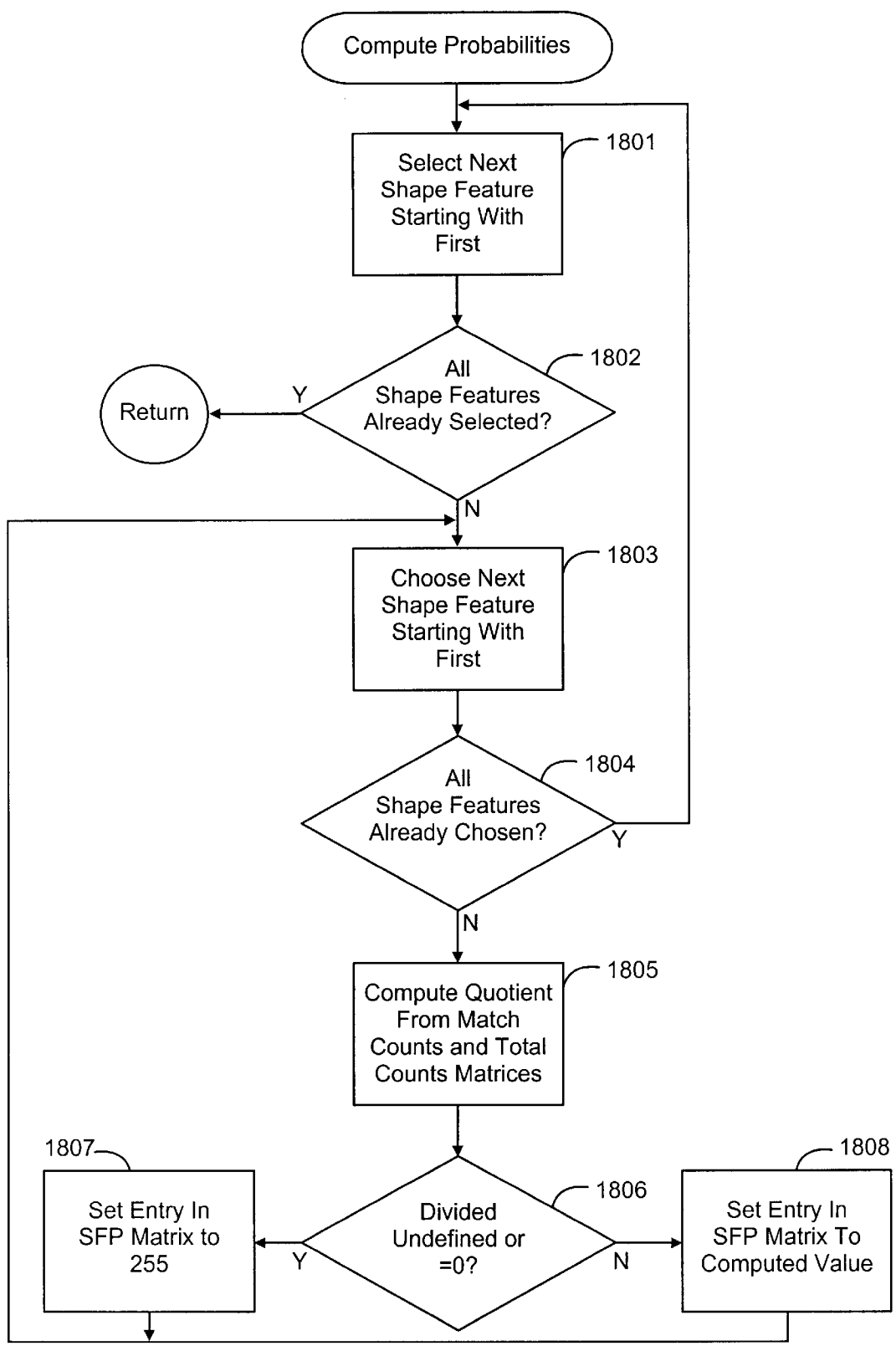
FIG. 18 is a flow diagram for the routine ComputeProbabilities.

FIG. 18 is a flow diagram for the routine ComputeProbabilities. This routine computes the final probability values for the shape feature probability ("SFP") matrix. The routine is passed the MatchCount and TotalCount matrices and returns the SFP matrix. The routine selects each possible combination of shape features as indices for corresponding entries of the MatchCounts, TotalCounts, and SFP matrices. In step 1801, the routine selects the next shape feature starting with the first shape feature. In step 1802, if all the shape features have already been selected, then the routine returns, else the routine continues at step 1803. In steps 1803–1808, the routine loops choosing each shape feature and calculating the probability for the selected and chosen shape feature pair. In step 1803, the routine chooses the next shape feature starting with the first. In step 1804, if all the shape features have already been chosen, then the routine loops to step 1801 to select the next shape feature, else the routine continues at step 1805. In step 1805, the routine divides the entry of the MatchCounts matrix indexed by the selected and chosen shape features by the corresponding entry of the TotalCounts matrix. In step 1806, if the quotient is 0 or undefined, then the routine continues at step 1807, else the routine continues at step 1808. In step 1807, the routine stores 255 in the entry of SFP matrix indexed by the selected and chosen shape features and loops to step 1803 to choose the next shape feature. In step 1808, the routine stores the value computed by the formula $$-10 * \frac{\ln(\text{quotient})}{\ln(2.0)} + 5$$

in the entry of SFP matrix indexed by the selected and chosen shape features and loops to step 1803 to choose the next shape feature. The routine also truncates this computed value to an integer. If the quotient is 0.5, representing a probability of 50%, then the computed value is 10. If the quotient is 0.25, representing a probability of 25%, then the computed value is 20. Each entry in SFP matrix represents the probability that two samples of equal length, with a pair of shape features at the same place within the shape feature string of the samples that correspond to the indices of the entries, have the same character identification. The lower the computed value in the SFP matrix, the more likely that the two samples have the same character identification. The natural logarithm is used in the formula so that probability values can be added. It will be appreciated by one skilled in the art that, since the count matrices are all diagonally symmetrical, the redundant, off-diagonal elements of each need only be calculated once.

Generating the Position Feature Probability Table

Figure 19:
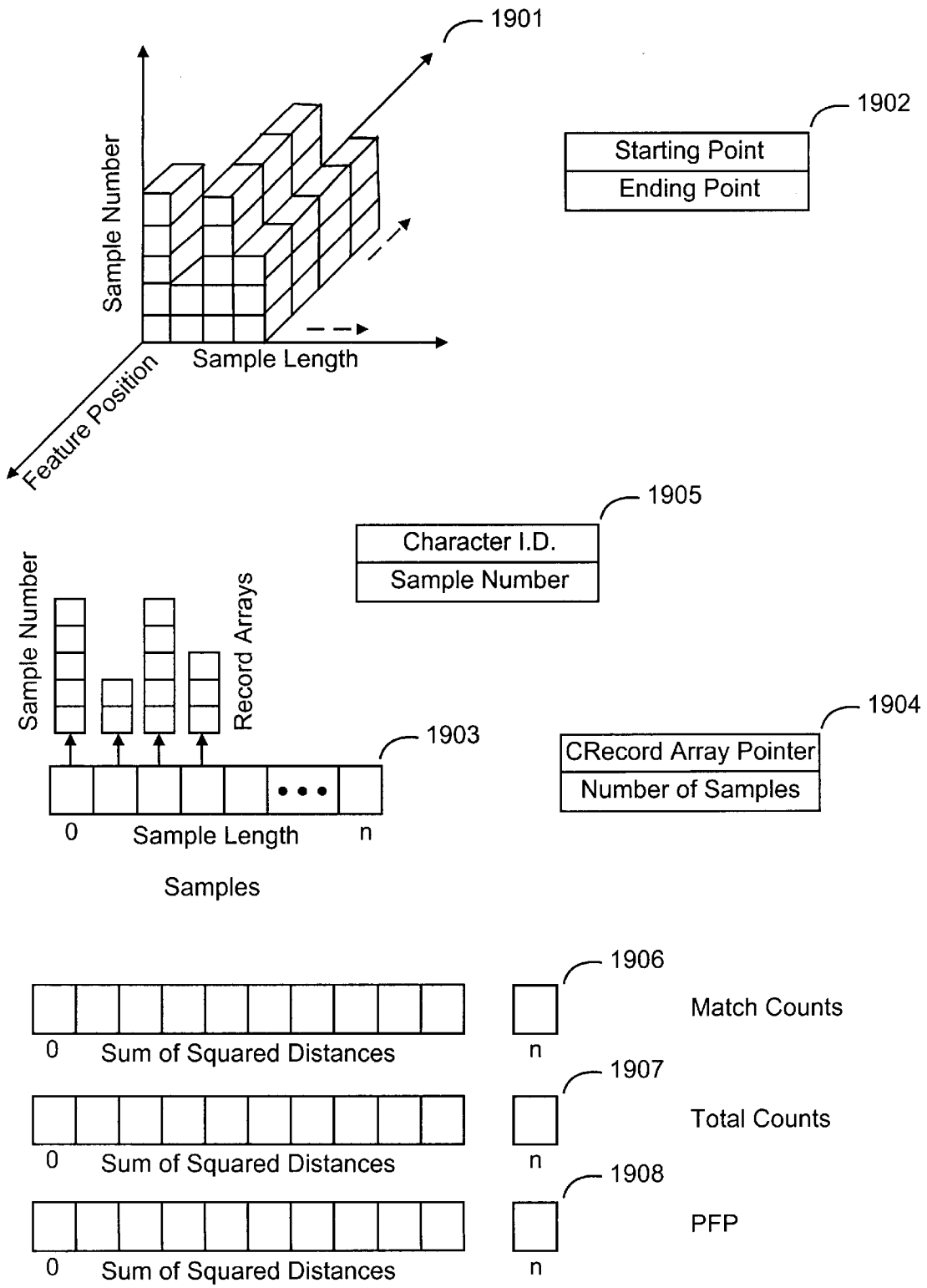
FIG. 19 is a diagram of the data structures used to generate the PFP table.

The system automatically generates the PFP table using several data structures. (Several of these data structures and the routines for processing the data structures are given similar names to those described for generating the SFP table because they are used in an analogous manner to generate the PFP table.) FIG. 19 is a diagram of the data structures used to generate the PFP table. The three-dimensional Positions array 1901 is used to hold the position features of all position feature strings of all sample characters in the database. This array is indexed by sample length, by the feature place within the position feature string, and by the sample number. The sample number and sample length uniquely identify each sample. The system assigns a unique sample number to each sample in each subset of samples that have the same length. That is, each sample of length 1 is assigned a sequential sample number starting at 0, each sample of length 2 is assigned a sequential sample number starting at 0, each sample of length 3 is assigned a sequential sample number starting at 0, and so on. Each entry of the Positions array has the form of the data record 1902 that contains the coordinates for the starting point and the coordinates of the ending point of a feature (i.e., a position feature). The Samples array 1903 contains one entry of the form of the data record 1904 for each possible sample length. Each entry of Samples array contains the number of samples with the sample length corresponding to the index of the entry, and a pointer to an array of records of the form of the CRecord data record 1905. The CRecord contains the character identification of a sample and the sample number. Each entry of the MatchCounts array 1906 and TotalCounts array 1907 contains the number of times each possible feature distance occurs in all possible pair-wise combinations of a set of samples. The MatchCounts array contains the number of times each feature distance occurs between all possible pairs of position features at the same place in the feature position strings of all possible pairs of samples of the same length and character identification. The TotalCounts array contains the number of times each distance feature occurs between all possible pairs of position features at the same place in all possible pairs of all samples of the same sample length.

FIGS. 20–24 illustrate a preferred technique for generating the PFP table. FIG. 20 is a diagram of the Samples array. The Samples array 2001 contains two entries. The first entry contains a 14, which indicates that the sample database has 14 samples of length one. The second entry contains a 35, which indicates that the sample database has 35 samples of length 2. The first entry of the Samples array points to the CRecords array 2003, and the second entry of the Samples array points to the CRecords array 2002. The CRecord array 2003 contains 14 entries, and the CRecords array 2002 contains 35 entries. Each entry 2004 contains two fields. The first field contains the character identification of the sample to which the entry corresponds and the second field contains the sample number for the sample.

Figure 21:
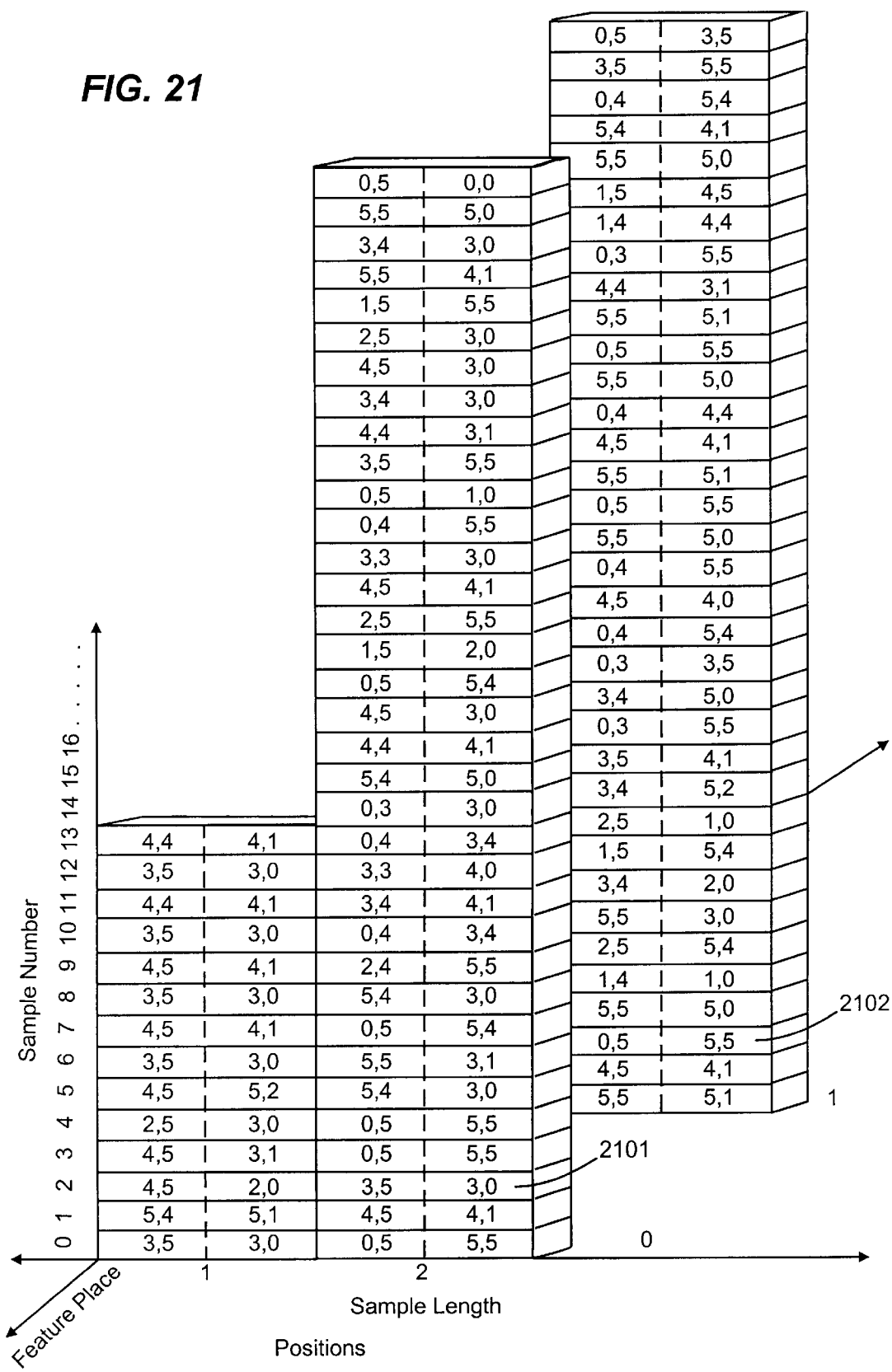
FIG. 21 is a diagram that illustrates the contents of the Positions array for the sample database.

FIG. 21 is a diagram that illustrates the contents of the Positions array for the sample database. The Positions array is indexed by the sample length, feature place, and sample number. Consider, for example, the first sample for the character similar to "T" as shown in FIG. 8. The sample is represented by entry 2004 and the CRecords array 2002. The entry has a character identification of 5 and a sample number of 2. Thus, the index into the Positions array for this sample is the sample length of 2, the feature place of 0, and the sample number of 2. Thus, entry 2101 contains the first position feature for the sample and entry 2102 contains the second position feature for the sample.

Figure 22:
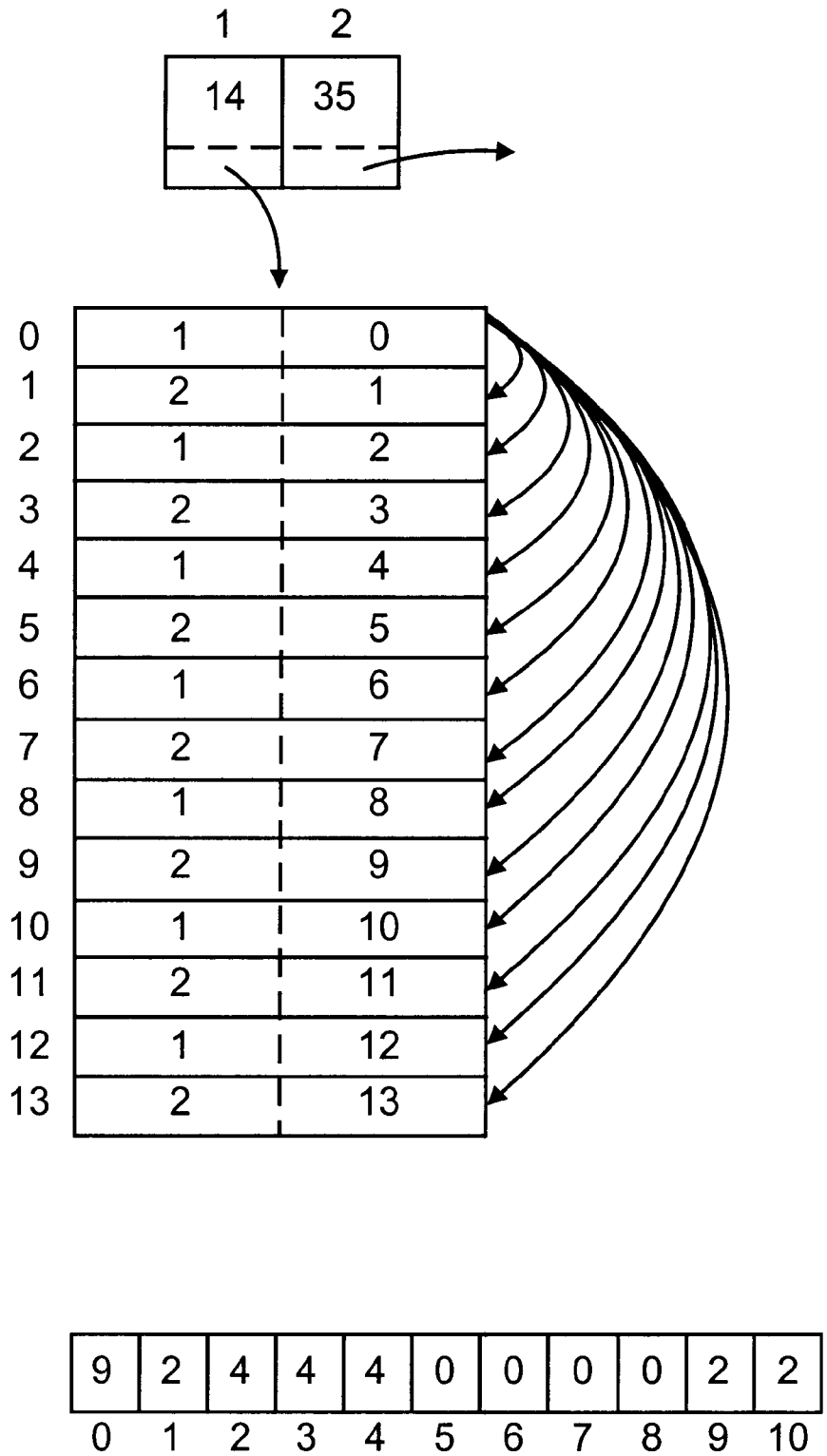
FIG. 22 illustrates the creation of the TotalCounts array.

FIG. 22 illustrates the creation of the TotalCounts array. To generate the TotalCounts array, the system processes each CRecords array in the following manner. The system selects each possible pair-wise combination of the entries in the CRecords array. The system then calculates the feature distance between the selected pair of entries based on the data in the Positions array. The system uses this feature distance as an index into the TotalCounts array. The system increments the indexed entry. For example, the position feature corresponding to the first entry is "[3,5:3,0]" and the position feature for the second entry is "[5,4:5,1]". The feature distance for this pair of position features is $(3-5)^2 + (5-4)^2 + (3-5)^2 + (0-1)^2$ which equals 10. Thus, the system increments the entry of the TotalCounts array indexed by feature distance 10.

Figure 23:
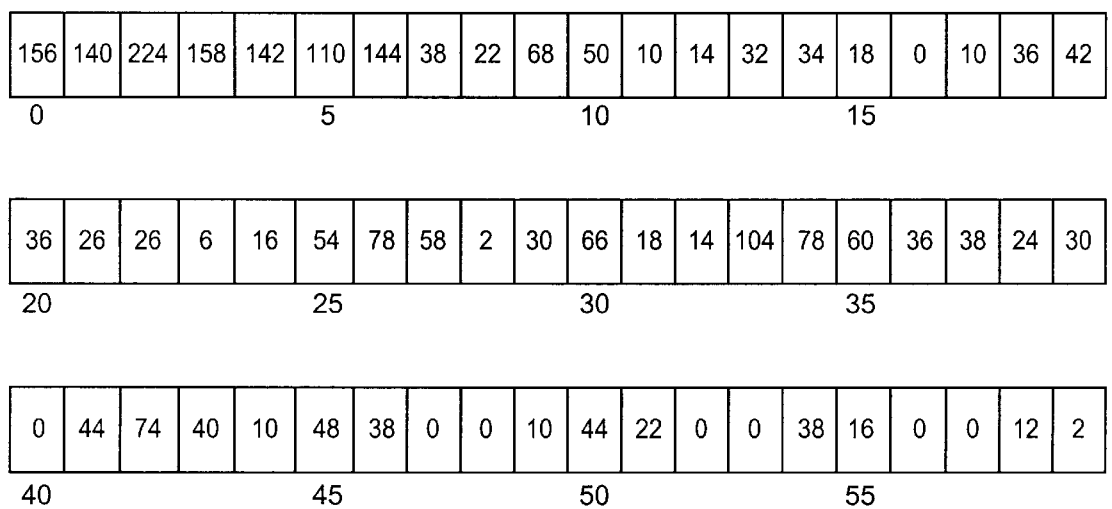

FIGS. 23 and 24 contain the resulting TotalCounts and MatchCounts arrays along with the PFP table. The MatchCounts array is calculated in a similar manner to the TotalCounts array except that the counts for each set of samples with the same character identification and the same length are separately calculated and accumulated. The PFP table is generated from the MatchCounts and the TotalCounts arrays.

Figure 25:
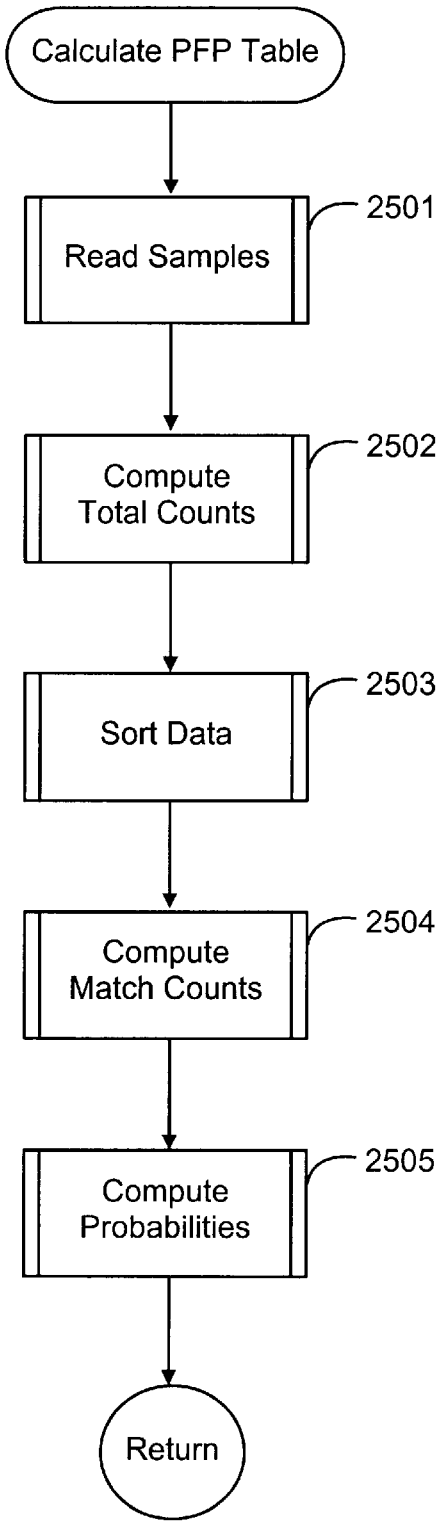
FIG. 25 is a flow diagram of the procedure CalculatePFPTable.

FIG. 25 is a flow diagram of the CalculatePFPTable procedure. This procedure is passed the database of hand-written character samples and calculates the values for a position feature probability ("PFP") table. The PFP table contains an entry for each possible feature distance. Each entry contains the probability that any two handwritten characters that have the same number of strokes and that have a pair of position features in the same relative place in their corresponding position feature string such that the feature distance between the pair of position features is equal to that feature distance will represent the same characters. Each position probability is independent of the other position features in the string and independent of any shape features. In step 2501, the procedure invokes the routine ReadSamples to generate the Positions array and Samples array based on the handwriting samples in the passed database. In step 2502, the procedure invokes the routine ComputeTotalCounts to generate the TotalCounts array. In step 2503, the procedure sorts the entries of the CRecords array by character identification to facilitate the selection of entries with the same character identification. In step 2504, the procedure invokes the routine ComputeMatchCounts to generate the MatchCounts array. In step 2505, the procedure invokes routine ComputeProbabilities to generate the PFP table from the TotalCounts array and the MatchCount array.

Figure 26:
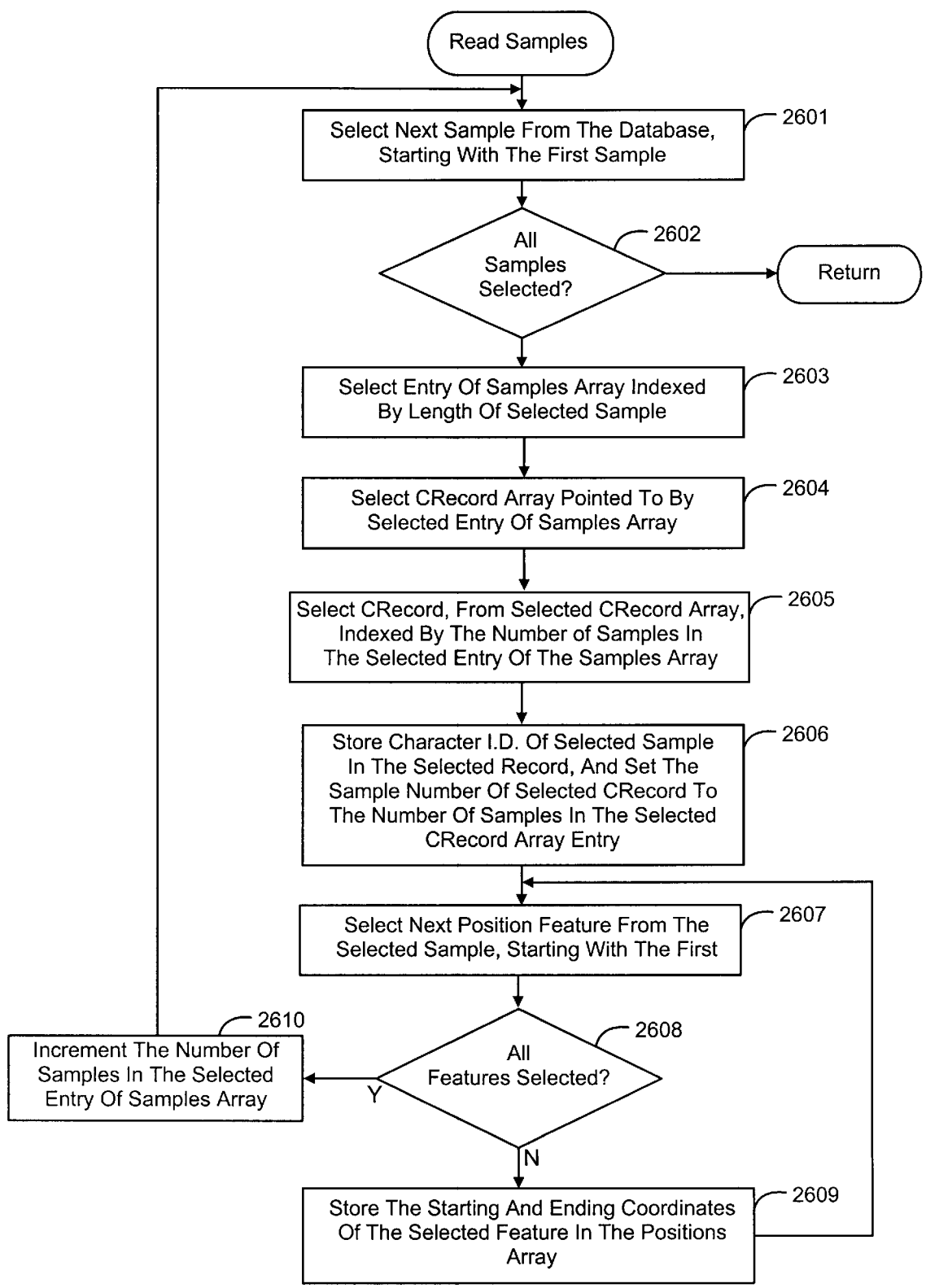
FIG. 26 is a flow diagram of the routine ReadSamples.

FIG. 26 is a flow diagram of the routine ReadSamples. This routine reads all the samples from the database, places their character identifications in the CRecord arrays pointed to from Samples array, and places their position features in the Positions array. In steps 2601 and 2610, the routine loops selecting each sample in the database and storing each position feature in the Positions array. In step 2601, the routine selects the next sample from the database starting with the first. In step 2602, if all the samples have already been selected, then the routine returns, else the routine continues at step 2603. In step 2603, the routine selects the entry of the Samples array indexed by the sample length of the selected sample. In step 2604, the routine selects the CRecord array that is pointed to by the selected entry of the Samples array. In step 2605, the routine selects the CRecord entry of the selected CRecord array that is indexed by the number of samples currently in the array. In step 2606, the routine stores the character identification of the selected sample in the selected CRecord entry and sets the sample number of the selected CRecord entry to the number of samples in the selected CRecord array. In steps 2607–2609, the routine loops selecting each position feature of the sample and storing the selected position feature in the Positions array. In step 2607, the routine selects the next position feature of the selected sample starting with the first. In step 2608, if all the position features of the sample have already been selected, then the routine continues at step 2610, else the routine continues at step 2609. In step 2609, the routine stores the selected position feature in the entry of the Positions array indexed by the length of the selected sample, by the place of the selected position feature within the selected sample, and by the sample number of the selected sample and then loops to step 2607 to select the next position feature. In step 2610, the routine increments the number of samples in the selected entry of the Sample array and loops to step 2601 to select the next sample.

Figure 27:
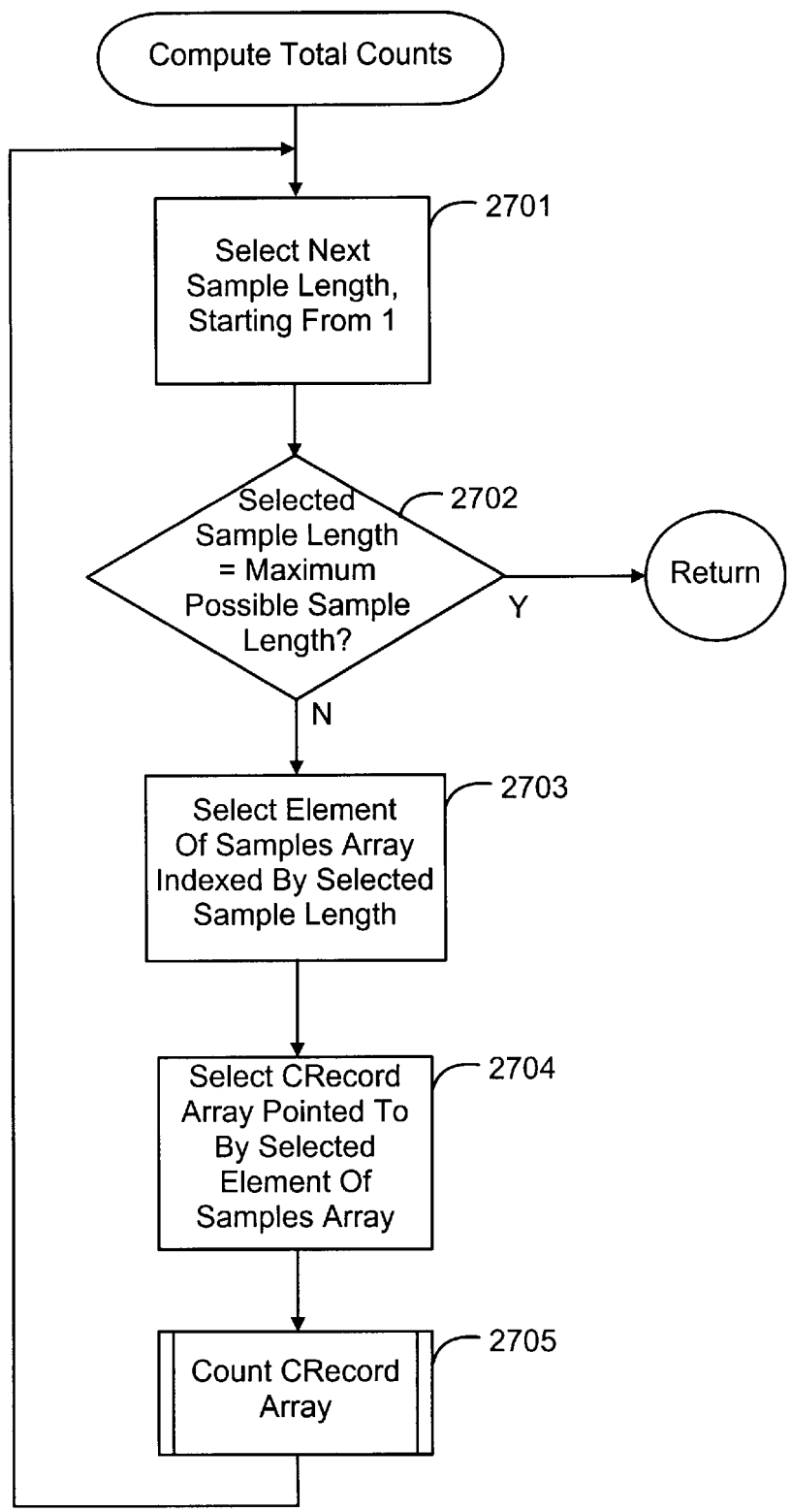
FIG. 27 is a flow diagram of the routine ComputeTotalCounts.

FIG. 27 is a flow diagram of the routine ComputeTotalCounts. This routine is passed a Positions array and Samples array, computes the number of times each particular feature distance occurs between all possible feature pairs during all possible pair-wise comparisons of samples with identical lengths, and stores the results in the TotalCounts array. This routine loops selecting each CRecords array in the Samples array and invokes the routine CountCRecords array to update the TotalCounts array. In step 2701, the routine selects the next sample length starting with the first. In step 2702, if the selected sample length is greater than the maximum sample length, then the routine returns, else the routine continues at step 2703. In steps 2703 and 2704, the routine selects the CRecords array of the Samples array indexed by the selected sample length. In step 2705, the routine invokes the routine CountCRecords array to update the TotalCounts array and loops to step 2701 to select the next sample length.

Figure 28:
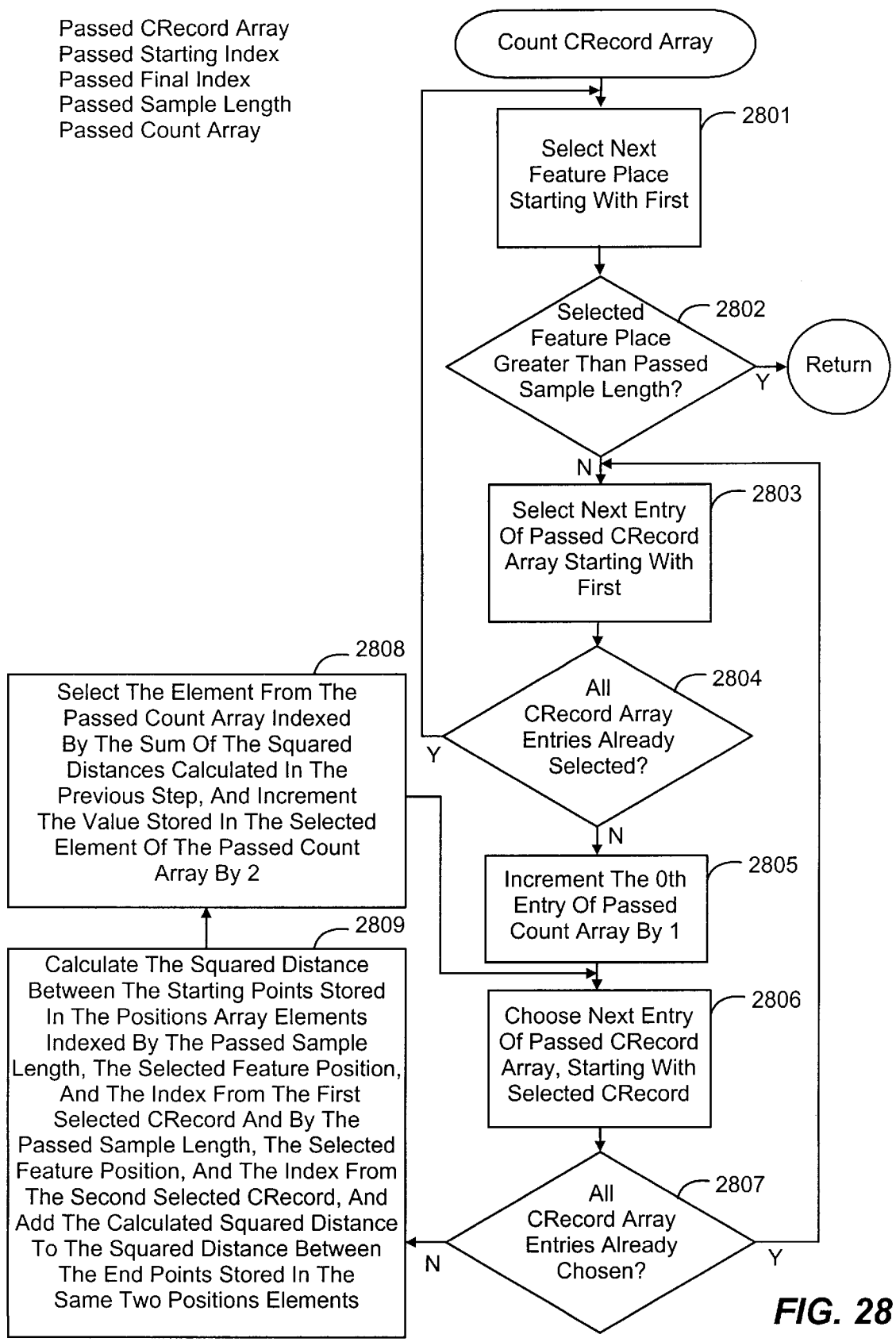
FIG. 28 is a flow diagram of the CountCRecordArray routine.

FIG. 28 is a flow diagram of the CountCRecordArray routine. The routine is passed a count array and a CRecord array. The routine makes all possible pair-wise comparisons of the samples in passed CRecord array, calculates the feature distance between each pair, and increments the entry of the passed feature count array. In steps 2801–1809, the procedure loops selecting each possible feature place and updating the count array. In step 2801, the routine selects the next feature place starting with the first. In steps 2802, if the selected feature place is greater then the sample length to which the passed CRecord array corresponds, then the routine returns, else the routine continues at step 2803. In steps 2803–2809, the routine loops selecting each possible pairwise combination of CRecord array entries, calculates the feature distance, and updates the passed feature count array. The routine preferably selects each pair of position features only once regardless of their order and calculates their feature distance only once but increments the count array by 2. In step 2803, the routine selects the next entry of the passed CRecords array. In step 2804, if all the CRecord array entries have already been selected, then the routine loops to step 2801 to select the next feature place, else the routine continues at step 2805. In step 2805, the routine increments the first entry of the passed count array to represent the comparison of the feature at the selected feature place in the sample represented by the selected CRecord with itself. The feature distance of any two identical position features is 0. In step 2806, the routine chooses the next entry of the passed CRecord array starting with the entry after the selected CRecord. In step 2807, if all CRecord array entries have already been chosen, then the routine loops to step 2803 to select the next entry of the past CRecords array, else, the routine continues at step 2808. In step 2808, the routine calculates the feature distance between the position features represented by the entry in the Positions array indexed by the sample length, by the selected feature place, and by the sample number in the selected CRecord and the entry of the positions array indexed by the sample length, by the selected feature position, and by the sample number of the chosen CRecord. In step 2809, the routine increments the entry of the count array indexed by the feature distance by 2. The entry is incremented by 2 because for each pair of samples corresponding to the selected and chosen CRecords, two comparisons would be made during comparison of all possible pairs of samples. In one comparison, one sample would be the first sample of the pair, and one sample would be the second sample of the pair. In the second comparison, the order of the samples would be reversed.

Figure 29:
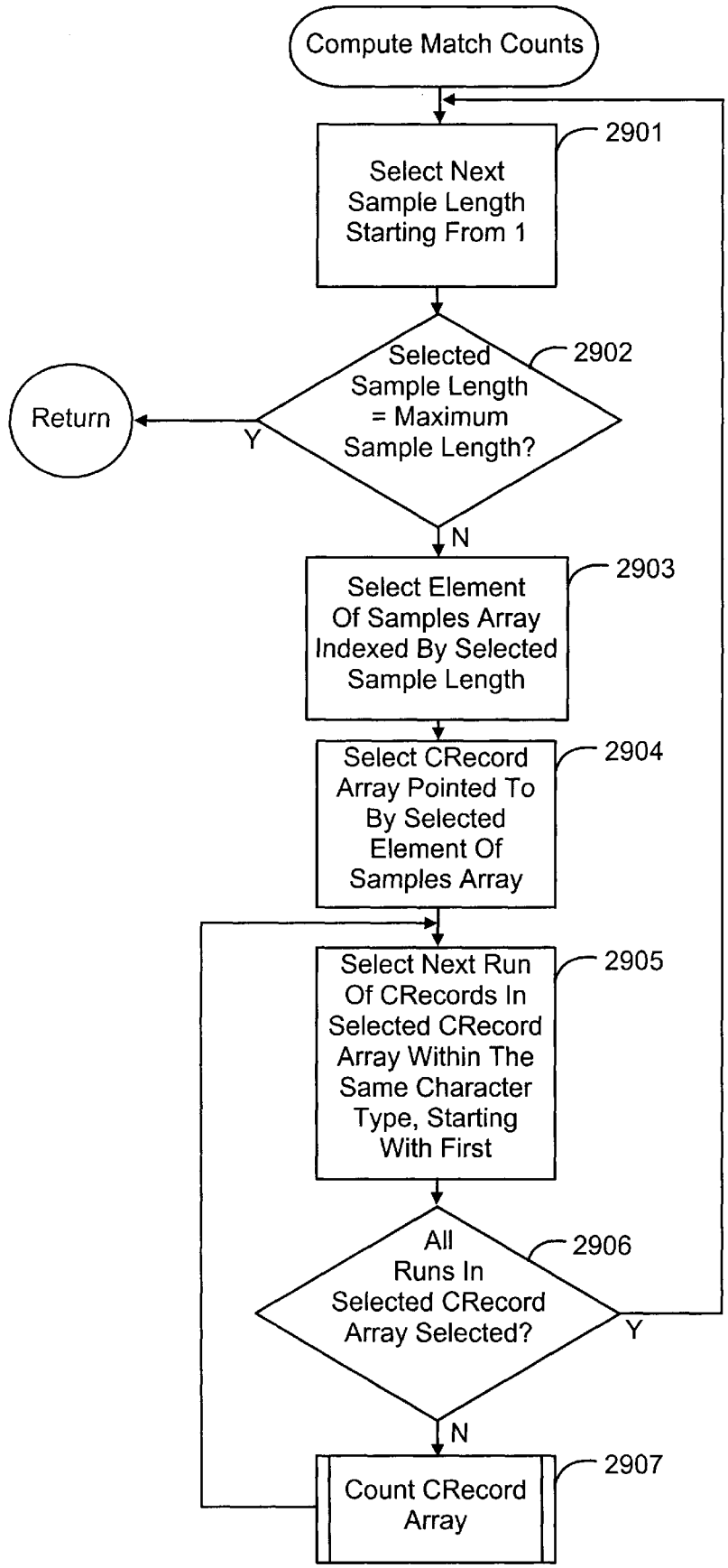
FIG. 29 is a flow diagram of the routine ComputeMatchCounts.

FIG. 29 is a flow diagram of the routine ComputeMatchCounts. This subroutine is passed the Positions array and the Samples array, computes the number of times each particular feature distance occurs in all corresponding position feature pairs during all possible pair-wise comparisons of samples with identical lengths and character identities, and stores the results in the MatchCounts array. In steps 2901–2907, the routine loops selecting each possible sample length and for each sample length, selects all the CRecords with the same character identifier, and invokes the routine CountCRecordsArray. In step 2901, the routine selects a next sample length starting with the first. In step 2902, if the selected sample length is greater than the maximum sample length, then the routine returns, else the routine continues at step 2903. In step 2903, the routine selects the entry of the Samples array indexed by the selected sample length. In step 2904, the routine selects the CRecord array pointed to by the selected entry of the Samples array. In steps 2905–2907, the routine loops selecting a group of all the CRecords in the selected CRecord array that have the same character identification. In step 2906, if all the CRecords in the selected CRecord array have already been selected, then the routine loops to step 2901 to select the next sample length, else the routine continues at step 2907. In step 2907, the routine invokes the routine CountCRecordArray and then loops to step 2905 to select the next group of CRecords with the same character identification. In a preferred embodiment, the entries of the CRecord arrays are sorted by character identification to facilitate the selecting of those CRecords with the same character identification.

Figure 30:
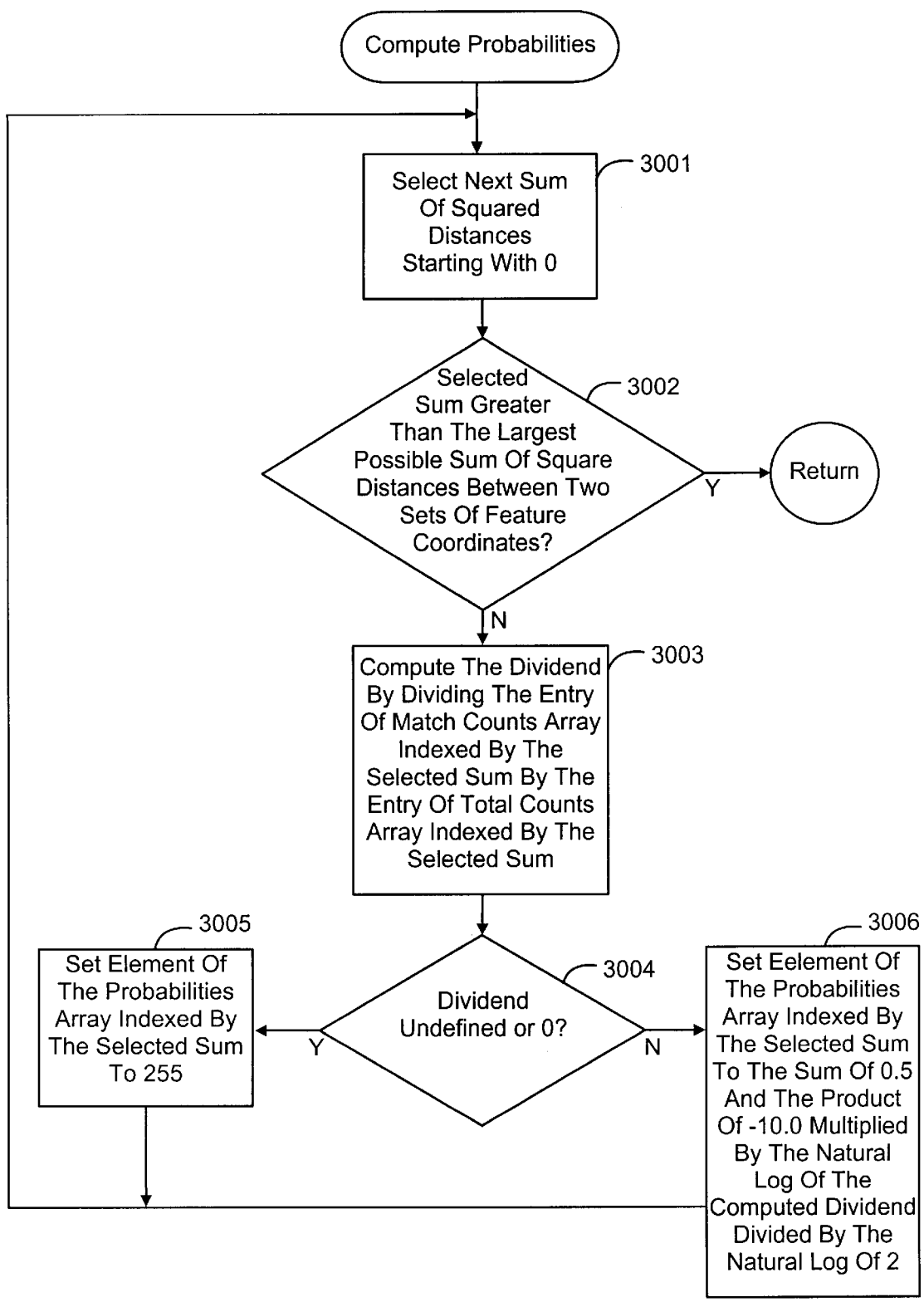
FIG. 30 is a flow diagram for the routine ComputeProbabilities.

FIG. 30 is a flow diagram for the routine ComputeProbabilities. This routine is passed the TotalCount and MatchCount arrays and computes the final probability values of the PFP table. In steps 3001–3006, the routine loops selecting each possible feature distance and calculates the probability based on the values in the MatchCounts and TotalCounts arrays. In step 3001, the routine selects the next feature distance starting with zero. In step, 3002, if all the feature distances have already been selected, then the routine returns, else the routine continues at step 3003. In step 3003, the routine divides the entry of the MatchCounts array indexed by the selected feature distance, by the entry of the TotalCounts array indexed by the selected feature distance. In step 3004, if the resulting quotient is zero or undefined, then the routine continues at step 3005, else the routine continues at step 3004. In step 3005, the routine sets the entry of the PFP table indexed by the selected feature distance to 255 and loops to step 3001 to select the next feature distance. In step 3006, the routine sets the entry of the PFP table indexed by the selected feature distance to the value computed by the formula.

$$-10.0 \frac{\ln(\text{quotient})}{\ln(2.0)} + 0.5 \qquad 5$$

This calculated result is truncated to an integer value. If the quotient is 0.5, representing a probability of 50%, then the computed value will be 10. If the dividend is 0.25, representing a probability of 25%, then the computed value will be 20. Each entry in PFP table represents the chance that two samples, having a feature distance between a corresponding pair of features equal to the index of the entry, have the same character identification. The lower the computed value, the more likely that the two samples have the same character identification. The natural logarithm is used in the formula so that probability values can be added.

It will be appreciated by one skilled in the art that the feature distances can all be pre-calculated to avoid computing them at various points in the above-described routines. In a preferred embodiment, 4 bit representations of the x and y coordinates for each possible grid point are concatenated to produce an 8 bit integer. Each possible grid point is thus represented by one of the 256 possible values of the 8 bit integer. A 256×256 matrix is constructed to contain all possible feature distances. Feature distances can then be extracted from the matrix by indexing with a point of one feature of a pair, represented by an 8 bit integer, and with the corresponding point of the other feature of the pair.

In the Kanji character recognition system embodiment of the present invention, the Kanji characters are superimposed on a 16×16 grid. There are therefore 901 possible geometric features. The feature set consists of 16 features. The SFP Matrix is size 16×16. There are tens of thousands character prototypes in the prototype database, and potentially hundreds of thousands to millions of character samples in the sample database. It should be readily appreciated by one skilled in the art that the automation of the generation of the probability tables represents an enormous time savings to the developer of a handwritten character recognition system. Furthermore, it allows for far easier development of pattern matching systems for symbols with which the recognition system developer is not intimately familiar. The present invention will facilitate entirely automated pattern recognition systems design.

The present invention may also find use in optical character recognition systems. It would allow the numerals and characters printed on checks to be efficiently recognized despite stylistic differences or commonly-occurring printing defects. Spell checking systems may employ the invention to recognize words despite common typographical errors, and to offer to the user several possible correct spellings when the error may have arisen from typing more than one word.

Although the present invention has been described in terms of a preferred embodiment, it is not intended that the invention be limited to this embodiment. Modifications within the spirit of the invention will be apparent to those skilled in the art. The scope of the present invention is defined by the claims that follow.

I claim:

1. A method in a computer system for generating a shape feature probability matrix for use in recognizing handwritten characters, the method comprising:

receiving a plurality of sample handwritten characters each sample handwritten character representing a character and having a sequence of one or more strokes each stroke represented by one of a plurality of shape features that describes a shape of the stroke;

determining for each sample handwritten character a shape feature string that represents that character, the shape feature string having the shape feature of each stroke in the sequence of one or more strokes for that character, each of the shape features in a shape feature string having a place within the shape feature string based on the sequence in which the described stroke was handwritten in the sample handwritten character;

for each possible combination of pairs of the plurality of shape features, generating a match count, for all possible pairs of shape feature strings representing the plurality of handwritten characters, of all occurrences of the combination in which one of the shape features of the combination is at a place within one of the pair of shape feature strings, in which the other of the shape features of the combination is at the same place within the other of the pair of shape feature strings, and in which each of the pair of shape feature strings represents the same character;

generating a total count, for all possible pairs of shape feature strings representing the plurality of handwritten characters, of all occurrences of the combination in which one of the shape features of the combination is at a place within one of the pair of shape feature strings and in which the other of the shape features of the combination is at the same place within the other of the pair of shape feature strings;

calculating a probability value based on the generated match count and the generated total count; and storing the calculated probability value for the combination of the shape features in the shape feature probability matrix, so that the stored probability values can be used to recognize handwritten characters.

2. The method of claim 1 wherein each shape feature string has a feature length indicating the number of feature shapes in the shape feature string and wherein generating the total count includes:

for each of the plurality of shape features,
    for each of a plurality of possible places within a feature string,
        for each of a plurality of possible feature lengths,
            generating a shape/place/length count of a number of times that the shape feature occurs at the place within a shape feature string having the feature length; and for each possible combination of pairs of the plurality of shape features,
    for each of the plurality of possible places within a feature string,
        for each of the possible feature lengths,
            multiplying the shape/place/length count for one of the shape features of the combination by the shape/place/length count for the other shape feature of the combination for the place and the feature length to generate a product; and
    accumulating the generated products as the total count for the combination of shape features.

3. The method of claim 1 wherein each shape feature string has a feature length indicating the number of feature shapes in the shape feature string and wherein generating the match count includes:

for each possible character,
  for each of the plurality of shape features,
    for each of a plurality of possible places within a feature string,
      for each of a plurality of possible feature lengths, generating a character/shape/place/length count of a number of times that the shape feature occurs at the place within a shape feature string representing the character and having the feature length; and
  for each possible combination of pairs of the plurality of shape features,
    for each of the plurality of possible places within a feature string,
      for each of the possible feature lengths,
      multiplying the character/shape/place/length count for one of the shape features of the combination by the character/shape/place/length count for the other shape feature of the combination for the place and the feature length to generate a product; and
    accumulating the generated products as the match count for the combination of shape features for the character; and
  totaling the accumulated products as the match count for the combination of shape features.

4. The method of claim 3 including sorting the shape feature strings according to the represented character.

5. The method of claim 1 wherein calculating the probability value includes dividing the generated match count by the generated total count.

6. The method of claim 1 wherein the probability value is calculated according to the following formula:

$$-10 * \frac{\ln(\text{probability})}{\ln(2)} + 0.5$$

where the probability is the generated match count divided by the generated total count.

7. The method of claim 1 wherein the probability value is logarithmically derived from the generated match count divided by the generated total count.

8. A computer readable memory for directing a computer to perform in accordance with the method of claim 1.

9. A method in a computer system for identifying a character represented by an unknown handwritten character, the computer system having plurality of character prototypes and a shape feature probability matrix, each character prototype representing a character and having a sequence of one or more strokes, each stroke represented by one of a plurality of shape features that describes a shape of the stroke, each character prototype being represented by a shape feature string having the shape feature of each stroke in the sequence, each of the shape features in a shape feature string having a place within the shape feature string based on the sequence in which the described stroke was handwritten in the character prototype, the shape feature probability matrix having a probability value for each possible pair of shape features, the method comprising:
  receiving a sequence of strokes of the unknown handwritten character;
  generating an unknown shape feature string to represent the unknown handwritten character based on the received sequence of strokes;
  for each character prototype,
    for each place in the unknown shape feature string,
      selecting the shape feature at the place in the unknown feature string;
      selecting the shape feature at the same place in the shape feature string of the character prototype; and
      retrieving the probability value for the selected shape features from the shape feature probability matrix; and
    combining the retrieved probability values to produce a combined probability value that the unknown handwritten character represents the same character as the character prototype; and
  selecting the character represented by the character prototype with the highest combined probability value as the identified character.

10. A method in a computer system for generating a position feature probability table for use in recognizing handwritten characters, the method comprising:
  receiving a plurality of sample handwritten characters, each sample handwritten character representing a character and having a sequence of one or more strokes, each stroke represented by one of a plurality of position features that describe starting and ending coordinates of the stroke;
  determining for each sample handwritten character a position feature string that represents that character, the position feature string having the position feature of each stroke in the sequence, each of the position features in a position feature sting having a place within the position feature string based on the sequence in which the described stroke was handwritten in the sample handwritten character;
  for each possible feature distance, each feature distance representing a combined distance between the starting coordinates of a pair of position features and between the ending coordinates of the pair of position features,
    generating a match count of all occurrences of the feature distance between each pair of position features in all possible pairs of position feature strings in which the pair of position features are at the same place within the pair of position feature strings and in which the pair of position feature strings represent the same character;
    generating a total count of all occurrences of the feature distance between each pair of position features in all possible pairs of position feature strings in which the pair of position features are at the same place within the pair of position feature strings;
    calculating a probability value based on the generated match count and the generated total count; and
    storing the calculated probability value for the feature distance in the position feature probability table,
  so that the stored probability values can be used to recognize handwritten characters.

11. The method of claim 10 wherein calculating the probability value includes dividing the generated match count by the generated total count.

12. The method of claim 10 wherein the probability value is calculated according to the following formula:

$$-10 * \frac{\ln(\text{probability})}{\ln(2)} + 0.5$$

where the probability is the generated match count divided by the generated total count.

13. The method of claim 10 wherein the probability value is logarithmically derived from the generated match count divided by the generated total count.

14. A computer readable memory for directing a computer to perform in accordance with the method of claim 10.

15. A method in a computer system for identifying a character represented by an unknown handwritten character, the computer system having a plurality of character prototypes and a position feature probability table, each character prototype representing a character having a sequence of one or more strokes, each stroke represented by one of a plurality of position features that describe stating and ending coordinates of the stroke, each character prototype being represented by a position feature string having the position feature of each stroke in the sequence, each of the position features in the position feature string having a place within the position feature string based on the sequence in which the described stroke was handwritten in the character prototype, the position feature probability table having a probability value for each possible feature distance, each feature distance representing a combined distance between the starting coordinates of a pair of position features and between the ending coordinates of the pair of position features, the method comprising:

receiving a sequence of strokes of the unknown handwritten character;

generating an unknown position feature string to represent the unknown handwritten character based on the received sequence of strokes;

for each character prototype,
for each place in the unknown position feature string,
selecting the position feature at the place in the unknown position feature string;
selecting the position feature at the same place in the position feature string of the character prototype; and
retrieving the probability value for the position distance between the selected position features from the position feature probability table; and
combining the retrieved probability values to produce a combined probability value that the unknown character represents the same character as the character prototype; and selecting the character represented by the character prototype with the highest combined probability value as the identified character.

16. The method of claim 15 wherein the computer system has a shape feature probability matrix, each stroke represented by one of a plurality of shape features that describes a shape of the stroke, each character prototype being represented by a shape feature string having the shape feature of each stroke in the sequence, each of the shape features in a shape feature string having a place within the shape feature string based on the sequence in which the described stroke was handwritten in the character prototype, the shape feature probability matrix having a probability value for each possible pair of shape features, the method further comprising:

generating an unknown shape feature string to represent the unknown handwritten character based on the received sequence of strokes;

for each character prototype,
for each place in the unknown shape feature string,
selecting the shape feature at the place in the unknown shape;
selecting the shape feature at the same place in the shape feature string of the character prototype; and
retrieving the probability value for the selected shape features from the shape feature probability matrix; and combining the retrieved probability values to produce a combined probability value that the unknown handwritten character represents the same character as the character prototype; and wherein the character represented by the character prototype with the highest total of the combined probability value of the shape feature and of the combined probability value of the position feature is selected as the identified character.

17. A method in a computer system for generating a probability table for use in identifying patterns, the method comprising:

receiving a plurality of sample patterns;

determining for each sample pattern an associated set of characteristics based on that sample pattern;

for each possible pair of sample patterns,
comparing the pair of sample patterns to generate a set of comparison values based on the characteristics associated with the pair of sample patterns; and for each possible comparison value,
generating a total count of the comparison value in the generated sets of comparison values;
generating a match count of the comparison value in the sets of comparison values that are generated from pairs of matching sample patterns;
calculating a probability value based on the generated match count and the generated total count; and
storing the calculated probability value in the probability table so that the stored probability value can be retrieved using the comparison value, so that the stored probability values can be used to recognize handwritten characters.

18. The method of claim 17 wherein each sample pattern comprises handwritten strokes.

19. The method of claim 17 wherein a characteristic of a sample pattern represents a shape of a stroke of the sample pattern.

20. The method of claim 18 wherein the characteristics in each set are ordered by an order in which the strokes are handwritten.

21. The method of claim 19 wherein each characteristic has a place within the set and wherein a comparison value is a pair of characteristics, a first characteristic of the pair is selected from the set of characteristics associated with a first sample pattern of the pair of sample patterns and a second characteristic of the pair is selected from the set of characteristics associated with a second sample pattern of the pair of sample patterns, wherein the first and second characteristics have the same place within the sets of characteristics from which they are selected.

22. The method of claim 20 wherein the probability table is a shape feature probability matrix.

23. The method of claim 17 wherein a characteristic of a sample pattern represents a pair of coordinates describing a starting point and an ending point of a stroke of the sample pattern.

24. The method of claim 21 wherein the characteristics in each set are ordered by the order in which the strokes are handwritten.

25. The method of claim 22 wherein each characteristic has a place within the set and wherein a comparison value is calculated by adding together the squared distance between the starting points and the squared distance between the ending points of two characteristics, the two characteristics being selected from the same place within the sets of characteristics representing the pair of sample patterns.

26. The method of claim 23 wherein the probability table is a position feature probability table.

27. A computer readable memory for directing a computer to perform the method of claim 17.

28. A method in a computer system for identifying an unknown input pattern comprising handwritten strokes, the computer system having a probability table and a plurality of pattern prototypes, each pattern prototype associated with a set of characteristics, a characteristic representing a shape of a stroke, the probability table having a probability value for each of a plurality of comparison values, the method comprising:

determining a set of characteristics for the unknown input pattern;

for each pattern prototype,
comparing the characteristics of the unknown input pattern with the characteristics of the pattern prototype to produce comparison values;
retrieving the probability values for the produced comparison values from the probability table; and
combining the retrieved probability values to produce a combined probability that the unknown input pattern matches the pattern prototype; and selecting the pattern prototype with the highest combined probability value as identifying the unknown input pattern, wherein the characteristics in each set are ordered by the order in which the strokes are handwritten and each characteristic has a position within the set of characteristics.

29. The method of claim 28 wherein each stroke has a place within the set of characteristics and wherein a comparison value is generated from a pair of characteristics, a first characteristic of the pair selected from the set of characteristics associated with the unknown pattern and a second characteristic of the pair selected from the set of characteristics associated with the pattern prototype, wherein the first and second characteristics have the same place within the sets of characteristics from which they are selected.

30. The method of claim 29 wherein the probability table is a shape feature probability matrix.

31. A method in a computer system for identifying an unknown input pattern comprising handwritten strokes the computer system having a probability table and a plurality of pattern prototypes, each pattern prototype associated with a set of characteristics, a characteristic representing a shape of a stroke, the probability table having a probability value for each of a plurality of comparison values, the method comprising:

determining a set of characteristics for the unknown input pattern:

for each pattern prototype,
comparing the characteristics of the unknown input pattern with the characteristics of the pattern prototype to produce comparison values;
retrieving the probability values for the produced comparison values from the probability table; and
combining the retrieved probability values to produce a combined probability that the unknown input pattern matches the pattern prototype; and selecting the pattern prototype with the highest combined probability value as identifying the unknown input pattern, wherein the characteristic in each set has a place within the set and wherein a comparison value is calculated by adding together the squared distance between the starting points and the squared distance between the ending points of two characteristics, the characteristics selected from the same place within the sets of characteristics representing the unknown pattern and the pattern prototype.

32. The method of claim 31 wherein the probability table is a position feature probability table.

33. A computer system for generating a probability table for use in identifying patterns, the computer system having a plurality of sample patterns, each sample pattern associated with a set of characteristics, comprising:

means for comparing each pair of sample patterns by generating a set of comparison values based on the characteristics associated with the pair of sample patterns;

means for generating a total count of the comparison values in the generated sets of comparison values for each possible comparison value;

means for generating a match count of the comparison values in the sets of comparison values that are generated from pairs of matching sample patterns for each possible comparison value;

means for calculating a probability value based on the generated match count and the generated total count for each possible comparison value; and means for storing the calculated probability values in the probability table so that the stored probability value can be retrieved using the comparison values.

34. A computer-readable medium containing instructions for causing a computer system to generate a probability table for use in identifying patterns, by:

receiving a plurality of sample patterns;

determining for each sample pattern an associated set of characteristics based on that sample pattern;

for each possible pair of sample patterns,
comparing the pair of sample patterns to generate a set of comparison values based on the characteristics associated with the pair of sample patterns; and for each possible comparison value,
calculating a probability value based on a total count of the comparison value in the generated sets of comparison values and a match count of the comparison value in the generated sets of comparison values that are generated from pairs of matching sample patterns; and
storing the calculated probability value in the probability table so that the stored probability value can be retrieved using the comparison value and used when identifying an unknown pattern with a set of characteristics, so that the stored probability values can be used to recognize handwritten characters.

35. A computer-readable medium containing a data structure for use by a computer system to identify patterns, each pattern having a set of characteristics, the data structure comprising:

for each possible pair of characteristics,
a stored probability value that is generated from a total count of that pair of characteristics that occur between each possible pair of sample patterns and from a match count of that pair of characteristics that occur between each possible pair of sample patterns that represent the same pattern, wherein each stored probability value can be retrieved from the data structure by using an indication of the pair of characteristics for that stored probability value, so that the stored probability values can be used to identify patterns.

36. The computer-readable medium of claim 35 wherein each pattern comprises handwritten strokes.

37. The computer-readable medium of claim 36 wherein a characteristic represents a shape of a stroke.

38. The computer-readable medium of claim 37 wherein the set of characteristics are ordered by the order in which the strokes are handwritten.

39. The computer-readable medium of claim 35 wherein each characteristic has a place within the set and wherein a first characteristic of a pair is selected from the set of characteristics associated with a first sample pattern of the pair of sample patterns and a second characteristic of the pair is selected from the set of characteristics associated with a second sample pattern of the pair of sample patterns, wherein the first and second characteristics have the same place within the sets of characteristics from which they are selected.

40. The computer-readable medium of claim 39 wherein the data structure is a shape feature probability matrix.

41. The computer-readable medium of claim 35 wherein a characteristic of a sample pattern represents a pair of coordinates describing a starting point and an ending point of a stroke of the sample pattern.

42. The computer-readable medium of claim 41 wherein the characteristics in each set are ordered by the order in which the strokes are handwritten.

43. The computer-readable medium of claim 42 wherein each characteristic has a place within the set and wherein a comparison value is calculated by adding together the squared distance between the starting points and the squared distance between the ending points of two characteristics, the two characteristics being selected from the same place within the sets of characteristics representing the pair of sample patterns.

44. The computer-readable medium of claim 43 wherein the data structure is a position feature probability table.

* * * * *